United States Patent
Monosov

(10) Patent No.: US 7,731,852 B2
(45) Date of Patent: Jun. 8, 2010

(54) BIOMASS SUPPORT MEMBERS AND PANELS, BIOLOGICAL PROCESSES AND BIOLOGICAL WASTEWATER TREATMENT APPARATUS

(75) Inventor: Efim Monosov, River Hills, WI (US)

(73) Assignee: Aquarius Technologies Inc., Port Washington, WI (US)

( * ) Notice: Subject to any disclaimer, the term of this patent is extended or adjusted under 35 U.S.C. 154(b) by 3 days.

(21) Appl. No.: 12/078,325

(22) Filed: Mar. 28, 2008

(65) Prior Publication Data
US 2008/0245731 A1    Oct. 9, 2008

Related U.S. Application Data

(60) Provisional application No. 60/960,395, filed on Sep. 27, 2007.

(51) Int. Cl.
  C02F 3/06   (2006.01)
  C02F 3/10   (2006.01)
(52) U.S. Cl. .................................. 210/615; 210/150
(58) Field of Classification Search ................. 210/615, 210/150, 151
See application file for complete search history.

(56) References Cited

U.S. PATENT DOCUMENTS

| | | |
|---|---|---|
| 3,238,124 A | 3/1966 | Burton |
| 4,088,571 A | 5/1978 | Helgesson |
| 4,165,281 A | 8/1979 | Kuriyama et al. |
| 4,294,694 A | 10/1981 | Coulthard |
| 4,411,780 A | 10/1983 | Suzuki et al. |
| 4,422,930 A | 12/1983 | Hatanaka |
| 4,717,519 A | 1/1988 | Sagami |
| 5,085,766 A | 2/1992 | Born |
| 5,104,716 A | 4/1992 | Basse et al. |
| 5,143,618 A | 9/1992 | Hyun et al. |
| 5,262,051 A | 11/1993 | Iwatsuka |
| 5,399,266 A | 3/1995 | Hasegawa |
| 5,516,691 A | 5/1996 | Gerlach |
| 5,526,656 A | 6/1996 | Conroy et al. |
| 5,567,314 A | 10/1996 | Chigusa et al. |

(Continued)

FOREIGN PATENT DOCUMENTS

DE    2 230 725    1/1974

(Continued)

OTHER PUBLICATIONS

Aquarius Technologies, Inc., "Biological Wastewater Treatment without Waste Sludge" (Sales Brochure), Jul. 14, 2006, Port Washington, US.

(Continued)

*Primary Examiner*—Christopher Upton
(74) *Attorney, Agent, or Firm*—Walter Ottesen

(57) ABSTRACT

Biomass support members, including woven textile media, useful in biological contact processes and apparatus; biomass support panels of limited flexibility and substantial surface expanse, with or without frames, comprising a variety of different woven or non-woven biomass supporting members, which may or may not include the foregoing media; biological treatment processes using biomass supporting panels in any at least partly supported growth biological process, whether a wastewater treatment or not; and biological wastewater treatment apparatus comprising diffusers and biomass support panels that may or may not include the above media, and which may also include certain preferred spatial and operational relationships.

19 Claims, 17 Drawing Sheets

U.S. PATENT DOCUMENTS

| | | | |
|---|---|---|---|
| 5,824,222 | A | 10/1998 | Keyser et al. |
| 6,153,099 | A | 11/2000 | Weis et al. |
| 6,241,889 | B1 * | 6/2001 | Haley, III .................... 210/615 |
| 6,319,407 | B1 | 11/2001 | Maatta |
| 6,406,630 | B1 | 6/2002 | Henry |
| 6,689,166 | B2 | 2/2004 | Laurencin et al. |
| 6,808,628 | B2 | 10/2004 | Chang et al. |
| 7,022,231 | B2 | 4/2006 | Mahendran et al. |
| 7,118,672 | B2 | 10/2006 | Husain et al. |
| 7,169,295 | B2 | 1/2007 | Husain et al. |
| 7,175,763 | B2 | 2/2007 | Husain et al |
| 7,294,259 | B2 | 11/2007 | Cote et al. |
| 2003/0136746 | A1 | 7/2003 | Behmann et al. |
| 2003/0226804 | A1 | 12/2003 | Haley, III |
| 2004/0229343 | A1 | 11/2004 | Husain et al. |
| 2005/0051481 | A1 | 3/2005 | Husain et al. |
| 2006/0037896 | A1 | 2/2006 | Cote et al. |
| 2006/0124518 | A1 | 6/2006 | Monosov et al. |
| 2006/0163157 | A1 | 7/2006 | Cote et al. |
| 2006/0175243 | A1 | 8/2006 | Mahendran et al. |
| 2007/0151923 | A1 * | 7/2007 | Haley, III .................... 210/615 |
| 2007/0181474 | A1 | 8/2007 | Lin |
| 2007/0238167 | A1 | 10/2007 | Perez et al. |
| 2008/0110827 | A1 | 5/2008 | Cote et al. |

FOREIGN PATENT DOCUMENTS

| | | | |
|---|---|---|---|
| JP | 3-27138 | * | 2/1991 |
| JP | 8-337956 | | 12/1996 |
| JP | 11-309475 | | 11/1999 |
| JP | 2001-239292 | | 9/2001 |
| JP | 2001-248044 | | 9/2001 |
| JP | 2002-119990 | | 4/2002 |
| JP | 2005-66432 | | 3/2005 |
| WO | WO 96/26161 | | 8/1996 |
| WO | WO 02/079104 | | 10/2002 |

OTHER PUBLICATIONS

Aquarius Technologies, Inc., "Multi-Stage Activated Biological Process (MSABP) Electro Catalytic Process (ELCAT)", Jun. 28, 2006, Port Washington, US.

BioScape Technologies, "Wastewater Purification Systems Bioreactor for Intensive and Final Purification-Photos and Drawings", www.bioscapetechnologies.com/photos.html,2003, pp. 1-4.

BioScape Technologies, "Wastewater Purification Systems Process Description", www.bioscapetechnologies.com/process.html, 2003, pp. 1-2.

BioScape Technologies, "Wastewater Purification Systems Systems in Place", www.bioscapetechnologies.com/systems.html, 2003, pp. 1-2.

BioScape Technologies, "Wastewater Purification Systems Technical Data", www.bioscapetechnologies.com/technical.html, 2003, pp. 1-5.

Brentwood Industries, "Fixed Film Technology for Water & Wastewater Treatment", from internet server, 2005, p. 1.

Brentwood Industries, "Fixed Film Technology for Water & Wastewater Treatment", www.brentwood-ind.com/water/specificapps_masthead.html, 2007, pp. 1, 1, 1-3.

Brentwood Industries, Technologies for Water and Wastewater, WEF Magazine, Aug. 2007, p. 28.

Chon, D.H., "Performance and Mechanisms of Excess Sludge Reduction in the Cannibal Process", Master's Thesis, Virginia Polytechnic Institute and State University, Mar. 30, 2005, pp. Abstract ,III, 60,61,62,63.

Content, T., "Startup gets $7.5 million in venture funding", JSOnline, Milwaukee Journal Sentinel, Sep. 10, 2006, www.jsonline.com.

Dickman, M., "Processes that Prevent Production of Waste Sludge Brought to Market by Venture-Backed Start-Up", Aquarius Technologies, Inc. press release, Sep. 11, 2006.

Gannon, R., "Multi-Stage Activated Biological Process (MSABP)", Aquarius Technologies, Inc. Powerpoint presentation, Port Washington, US.

2 pages of drawings from Jh Ranch, Elif Technologies.

Mogollon, C.D., "Q&A: An Interview wih Aquarius Technologies' Tom Pokorsky", Media for WaterWorld, Pennwell Corporation, Nov.-Dec. 2006, ww.pennnet.com/Articles.

"Multi-Stage Activated Biological Process", ELIF Environmental Powerpoint presentation, Jun. 2006.

"The Anatomy of the Cannibal Process", "Our Proven Cannibal Process Eliminates Biosolids Wasting", Sales Brochure, before Jul. 2007, pp. 1-2.

Roxburgh, R. et al, "Sludge Minimization Technologies-Doing More to Get Less", Water Environment Foundation, 2006, Calgary, Canada, pp. 518-520.

Sacks, R., "L Capital Partners Leads $7-Million Financing of Aquarius Technologies, Inc.", L Capital Press Release, Sep. 11, 2006, pp. 1-2.

"Innovative BioFicient Treatment Process Eliminates Regular Biosolids Wasting/Handling", Smith & Loveless Inc.Brochure 9099-1, 2004, www.smithandloveless.com.

Maeda et al, "Simulation of Contact Biooxidation Process Using a Fixed Bed", J. Ferment. Technol., 1975, pp. 875-884, vol. 53, No. 12.

Kojima et al, Industrial Water and Waste Water, 1972, pp. 960-966, vol. 14, No. 8.

* cited by examiner

CUT-AWAY VIEW OF RACK w/MEDIA

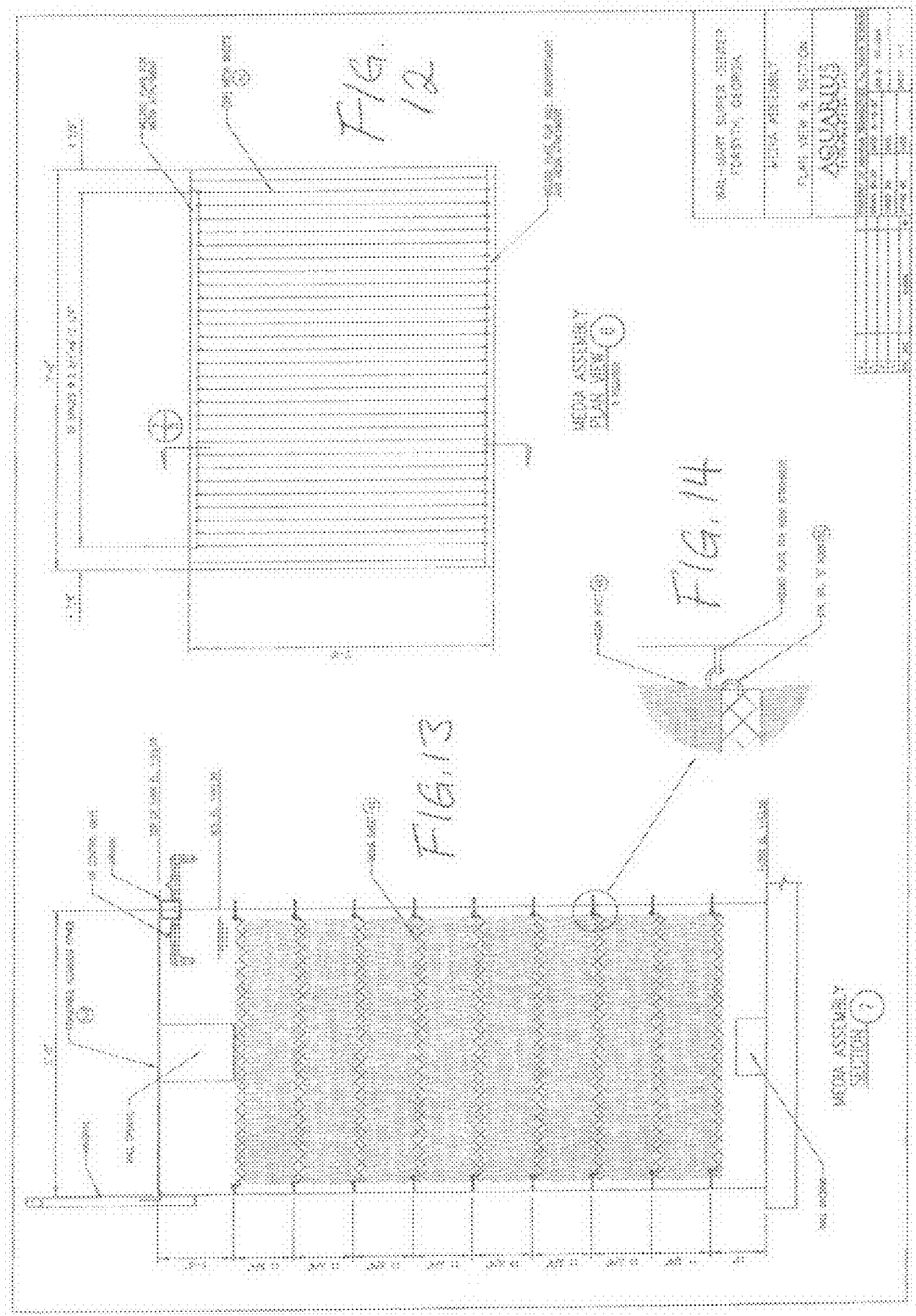

BIOMASS SUPPORT MEMBERS AND PANELS, BIOLOGICAL PROCESSES AND BIOLOGICAL WASTEWATER TREATMENT APPARATUS

CROSS REFERENCE AND INCORPORATION BY REFERENCE

This application claims all benefits, including priority under 35 U.S.C. 120, from its copendency with, and the prior filing of, U.S. Provisional Patent Application Ser. No. 60/960,395, filed Sep. 27, 2007, the entire contents of which are incorporated herein by reference for all purposes. To the extent its disclosures are in addition to and not in conflict herewith, the subject matter of prior U.S. patent application Ser. No. 11/008,922, filed Dec. 13, 2004, now issued on Apr. 21, 2009 as U.S. Pat. No. 7,520,980, is also incorporated herein by reference for all purposes.

TECHNICAL FIELD

This disclosure relates to
Biomass support members—e.g., non-woven support members and woven textile media ("media"), useful in biological contact processes and apparatus;
Panels—biomass supports of limited flexibility and substantial surface expanse, with or without frames, comprising a variety of different woven or non-woven biomass supporting members, which may or may not include the foregoing media;
Biological treatment processes—use of biomass supporting panels in any at least partly supported growth biological process, whether a wastewater treatment or not and
Wastewater treatment apparatus—biological wastewater treatment apparatus comprising diffusers and biomass support panels that may or may not include the above media, and which may also include certain preferred spatial and operational relationships.

SUMMARY

Among others, the present application discloses a number of inventions which may be summarized as follows:
1. Biomass support member comprising:
   A. an elongated flexible mass of threads in the form of open-structure, bunched biomass-supporting elongated yarns that
   1. are crowded together sufficiently in the mass in sufficient number to impart to the mass at least one of the following properties a, b, c, d or e:
      a. T, a general thickness value of at least 20 mm, that exceeds the average length-weighted yarn width of the respective yarns,
      b. Tw, the ratio of the thickness (T) of the member to average length-weighted yarn width (w) of substantially at least 3,
      c. Lt, average light transmission value, of less than 70,
      d. Wm, ratio of weight of water (W) absorbed per unit weight of member (m), in excess of 3.7,
      e. Wa, biomass attachment weight capacity per unit weight of clean member, of at least 0.8,
   comprises gathered curly filaments in the yarns, and run
      generally in a common direction,
      along-side one another in the mass, and
      with overlapping of adjacent yarns of the mass,
   which mass of yarns has
      an expanse of length and width that are each at least 15 times their general thickness, and
      is "hydraulically open" in that water can flow from one face of the member, when laden with biomass, to biomass in the interior of the member.
2. Biomass support member according to invention 1 wherein the filaments are non-hollow.
3. Biomass support member according to invention 1 wherein the filaments are of multi-lobed cross-section.
4. Biomass support member according to invention 1 wherein filaments of adjacent yarns, throughout the mass, overlap one another.
5. Biomass support member according to invention 1 wherein the mass has a plurality of cross-supports, extending across the yarns at two or more intervals of yarn length and holding the yarns together in regions that, collectively, represent a minor proportion of total yarn length.
6. Biomass support member according to invention 5 wherein the yarns are free to move with respect to one another in one or more directions radial to yarn length.
7. Biomass support member according to invention 5 wherein the yarns, between the cross-supports, are substantially free of connection to adjacent yarns.
8. Biomass support member according to invention 5 wherein the cross-supports are separated by intervals of yarn length of at least about 20 cm.
9. Biomass support member according to invention 6 wherein the above-mentioned thickness value exists within the above-mentioned intervals of yarn length.
10. Biomass support member according to invention 5 wherein the member includes at least three cross-supports within its length.
11. Biomass support member according to invention 1 wherein the mass of yarns is a textile material having cross-supports in the form of woven bands comprising said yarns and additional threads interwoven with said yarns.
12. Biomass support member according to invention 11 wherein the yarns are compressed radially in the locus of the cross-support, yarns with aggregate widths exceeding the width of the member are included in a given width of the member and overlapping of adjacent yarns provides a support member thicker than the average width of the yarns of which it is made.
13. Biomass support member according to invention 1 comprising yarns that comprise, along their lengths, repeating segments having widths of greater and lesser width than the length-weighted average widths of the respective yarns.
14. Biomass support member according to invention 1, deployed in a spread out condition as a biomass-supporting panel, in a biological treatment vessel.
15. Biomass support member according to invention 14 wherein the panel is a structure which has one or more surfaces deployed for biomass attachment with an aggregate projected area of at least 0.5 $m^2$ and which, in its intended orientation and when subjected to normal water and gas currents within the biological treatment vessel, remains deployed in a spread out condition.
16. Biomass support member according to invention 14 wherein the member is spread by attachment through cross-supports of the member to the vessel either directly to the vessel or to a frame that supports the member.
17. Biomass support member according to invention 14 wherein the member is installed in the panel in an unstretched condition.

18. Biomass support member according to invention 14 wherein the member is installed in the panel in a stretched condition.
19. Biomass support member according to invention 18 wherein the member, as installed, retains at least 20%, more preferably at least 50% and still more preferably at least about 65% of its stretch potential.
20. Biomass support member according to invention 14 wherein at least a predominant number of the yarn segments used for making up the panels have stretch potential values S of at least about 0.25, S being the inverse ratio, for the respective yarn segments, of
    d, the direct distance between the ends of a yarn segment when in a relaxed state and reasonably straight, and
    the difference between d and D, D being the distance between the segment ends when the segment is stretched straight, or nearly so, without permanently altering its length.
21. Biomass support member according to invention 14 comprising yarns mounted in plural panels, which panels comprise free yarn segments that are free to move independent of adjacent yarns in radial directions and that have lengthwise slack in them to afford controlled swaying of the yarns along their lengths in response to upward hydraulic currents in the treatment vessel.
22. Biomass support member according to invention 14 in combination with diffusers, disposed in the vessel, for discharging oxygen-containing gas into liquid in the vessel.
23. Biomass support member according to invention 1 wherein the member, in its face to face direction, includes plural layers of yarn.
24. Biomass support member according to invention 1 wherein the yarn has large numbers of curly filaments comprising curved filament segments that are parts of longer filaments, that are distributed abundantly along the length of the yarn and that curve away from, and back toward, the center of the yarn, leaving open space between outer curved segments and other filaments nearer the center of the yarn.
25. Biomass support member according to invention 24 wherein the curved filament segments of the respective yarns overlap large numbers of curved filament segments of adjacent yarns.
26. Biomass support member according to invention 1 wherein the yarn has an open-ness value, Aa, the quotient of dividing the length-weighted cross-sectional area of the yarn by the cross-sectional area the filaments of the yarn would fill if not spread apart, of at least about 60.
27. Biological treatment process which comprises, in at least a portion of the process, using panels according to invention 14 to support biomass.
28. Biological treatment process according to invention 27 which comprises both supported growth processing and suspended growth processing.
29. Biological treatment process according to invention 27 comprising conducting the process in plural biological treatment stages in which at least one stage comprises supported growth processing on the panels.
30. Biological treatment process according to invention 29 in which the water under treatment flows sequentially and substantially through a plurality of vessels, at least one of which comprises the panels, in which the overall flow through the process is plug flow and the wastewater circulates within the vessels.
31. Biological treatment process according to invention 28 which includes causing microorganisms in aqueous biomass supported by the panels to treat material in a vessel and supporting such treatment by the biomass through discharging gas into the vessel.
32. Biological treatment process according to invention 31 in which the gas is discharged into the vessel from without the filaments of the biomass support.
33. Biological treatment process according to invention 31 in which the gas is discharged into the vessel from without the yarns making up the support member.
34. Biological treatment process according to invention 31 in which the gas is discharged into the vessel from outside the biomass.
35. Biological treatment process according to invention 31 in which the gas is oxygen-containing gas and the majority of the oxygen requirements of the process are supplied from outside the filaments, yarns and biomass.
36. Biological treatment process according to invention 31 in which the gas is oxygen-containing gas and substantially all oxygen requirements of the process are supplied from outside the filaments, yarns and biomass.
37. Biological treatment process according to invention 27 comprising, in one or more liquid-containing treatment zones, causing controlled amounts of biomass to slough off into the wastewater in one or more successive zones while causing a substantial amount of biomass supported in the respective zones to remain and continue growing on the panels in those zones.
38. Biological treatment process according to invention 37, conducted with sloughing off of biomass from said panels in a plurality of said zones.
39. Biological treatment process according to invention 38 in which the panels are used as microbe supports in multistage activated biological processes (MSABPs) comprising spatial microorganism succession and trophic hydrobiont chains, said chains being segregated in sequentially arranged zones, in which conditions are provided that cause controlled amounts of biomass to slough off from supported microbe populations in a succession of zones, sloughed off microbes are passed downstream from zone to zone and are eaten by progressively different populations of microorganisms supported by the panels in the succeeding zones.
40. Biological treatment process according to invention 39 comprising treating wastewater in a highly loaded upstream stage, causing the wastewater to progress through one or more intermediate stages in which the loading decreases from stage to stage, and further treating the wastewater in a downstream or final stage in which the load is very low.
41. Biological treatment process according to invention 39 in which the overall flow of wastewater in the process is plug flow with circulation of wastewater within the zones.
42. Biological treatment process according to invention 39 in which the process operates substantially without recycling from downstream stages to upstream stages.
43. Biological treatment process according to invention 39 in which the mass quantity of organic matter proceeding from a given stage to the next is lower than the mass quantity of organic matter entering the given stage, whereby the total organic matter under treatment, comprising organic waste and biomass carried over from stage to stage, decreases from stage to stage.
44. Biological treatment process according to invention 43 in which the quantity of biomass maintained in succeeding stages also diminishes as the quantity of food available in successive stages decreases.

45. Biological treatment process according to invention 44 wherein processing progresses through successive stages until there is not enough food for biomass growth, such growth is negligible and there is little or no organic or waste sludge by-product.
46. Biological treatment process according to invention 27 comprising conducting the process in plural biological treatment stages comprising nitrifying and de-nitrifying stages.
47. Biological treatment process according to invention 27 comprising conducting the process in plural biological treatment stages in at least one de-nitrifying zone in which anoxic nitrifying conditions exist in portions of the biomass, in which the biomass also contains aerobic bacteria, and in which small amounts of excess oxygen are present for the benefit of the aerobic bacteria.
48. Biological treatment process according to invention 27 in which at least about 90% of the sludge generated and passed from stage to stage in the process is consumed in the process.
49. Biological treatment process according to any preceding process invention in which said member is present in panels comprising yarns with intervals of length within which the yarns are substantially free of restraint to afford controlled lateral swaying of the yarns in radial directions along their lengths, with the aid of currents of oxygen-containing gas rising through liquid adjacent and/or through the yarns of the panels.
50. Biological treatment of wastewater according to invention 49.
51. Biological treatment process according to invention 50 in which the amount of sludge present in the treated water released from the process has a concentration in that water of 30 mg/l or less.
52. Biological wastewater treatment plant comprising a series of at least three wastewater aeration vessels connected for sequential flow of wastewater under treatment through the series of vessels, a plurality of panels of biomass support members according to invention 5 disposed in spaced apart relationship to one another in a plurality of the vessels, the support members being secured in a deployed condition in the vessels, diffusers in the vessels to discharge oxygen-containing gas into the wastewater and the panels being deployed over the diffusers to cause currents of aerated wastewater to rise between panels.
53. Biological wastewater treatment plant according to invention 52 comprising support member filaments that are non-hollow.
54. Biological wastewater treatment plant according to invention 52 comprising support member filaments that are of multi-lobed cross-section.
55. Biological wastewater treatment plant according to invention 52 comprising filaments of adjacent yarns of the support members that overlap one another and wherein the support members comprise plural layers of the yarns.
56. Biological wastewater treatment plant according to invention 52 comprising panels which are sufficiently hydraulically open so that currents of water containing dissolved oxygen can pass through the member, from one member face into the member and biomass toward the other face, bearing oxygen to microbes within biomass supported on the panels.
57. Biological wastewater treatment plant according to invention 56 comprising panels which are sufficiently hydraulically open so that currents of water containing dissolved oxygen can pass through the member, from one face all the way through to the other face.
58. Biological wastewater treatment plant according to invention 52 wherein the vessels contain panels that are square or rectangular, these panels being at least substantially upright and having their upper edges at an actual or design water level for the wastewater in the vessel.
59. Biological wastewater treatment plant according to invention 58 wherein the substantially upright panels are substantially vertical.
60. Biological wastewater treatment plant according to invention 52 comprising panels comprising yarns having portions of their length free for lateral motion and sufficiently limited in flexibility that, in their intended orientation and in the face of normal water and gas currents within the biological treatment vessels in which they are deployed, will remain stable and deployed in long term operation for at least six months.
61. Biological wastewater treatment plant according to invention 52 comprising biomass support members comprising woven or non-woven cross-supports to hold the yarns of the support members together, and the cross-supports serving as support member attachment points to keep the yarns deployed in a stable manner as generally planar and/or non-planar panels in the currents of wastewater and aeration gas present in an operating wastewater treatment tank.

The invention is related in part to a biomass support member comprising threads in the form of open structure elongated yarns running generally in a common direction in crowded relationship, being held together at three, four or more intervals of yarn length by elongated cross-supports that extend across the yarns in regions that represent a minor proportion of total yarn length. Within repeating intervals of length between the cross-supports, there are yarn length segments that include in the aggregate a major proportion of total yarn length and are free to sway in response to liquid and gas currents when submerged in an aerated liquid medium such as wastewater.

The present inventions also include in certain of their aspects improved biomass support members which are described in lettered paragraphs below.

A. In a general aspect, the present inventions comprise elongated flexible masses of thread members comprising open-structure bunched biomass-supporting elongated yarns running generally in a common direction, which masses, when lying on a flat horizontal surface and not stretched, have
   a general thickness of at least 20, more preferably at least 25 and more preferably at least 30 cm which exceeds the average length-weighted yarn width of the respective yarns and
   an expanse of length and width such that their length and width are each at least 15, preferably at least 30 and most preferably at least 40 times their general thickness, the yarns of said masses being
   held together at two, three, four or more intervals of yarn length by cross-supports extending across the yarns in regions that represent a minor proportion of total yarn length, and
   free to move with respect to one another in one or more, and preferably all, directions radial to yarn length and still more preferably are substantially free of connection to adjacent yarns to afford opportunity for swaying action of the member in response to liquid and gas currents when submerged in an aerated liquid medium such as wastewater.

The inventions disclosed herein also include the foregoing general aspect in combination with any one, or with any combination of, the additional features listed below and/or described in other portions of this disclosure:

B. The yarns of the masses may be composed to a substantial extent of deviant path filaments, filaments that deviate from a straight line path in the yarns, such as can be fostered, for example, by crimping, curling, twisting and/or imparting differential tension to the filaments prior to and/or during the yarn-making process.

C. The yarns may have a length-weighted average width of at least about 6, more preferably at least about 6.5 and more preferably at least about 7 mm.

D. The yarns may comprise, along their lengths, repeating segments having widths of greater and lesser width than the length-weighted average width.

E. The yarns may have a compression ratio of at least about 5, or at least about 10, or in the range of 10-70, or in the range of 10-60, or be within a preferred range of up to about 25 or 30.

F. The cross-supports include threads inter-engaged with the yarns, preferably of higher tensile modulus than the threads.

G. Panels composed in part of the foregoing yarns with cross-supports which may or may not be interwoven with the yarns.

The inventions also relate, in another aspect, to biomass-supporting panels comprising the improved biomass support member of the present invention. Such panels are of limited flexibility and substantial surface expanse, with or without frames, and comprise a variety of different woven or non-woven biomass cross-supports, which may or may not include the foregoing member. In certain preferred embodiments, biomass support members as above described and/or other forms of biomass support members may be mounted in free-standing or vessel-secured racks or frames, or using portions of vessels as part of the structure to keep the member deployed in a stable, spread out condition.

The inventions also relate, in another aspect, to biological treatment processes—use of the biomass supporting panels, as above described, in any at least partly supported growth biological process, whether a wastewater treatment process or not.

In yet another aspect, the inventions relate to wastewater treatment apparatus comprising panels that include the above and/or other kinds of members, as well as diffusers, and that may also include certain preferred spatial and operational relationships.

DEFINITIONS filament (an individual fiber included in a thread, including a yarn, and in this disclosure it generally refers to the ultimate or individual fibers present in the yarns contained in the member of the present invention)

yarn (an elongated bundle of many very fine filaments, including especially elongated filaments, gathered together and extending together in the same general direction, whether such fibers are relatively straight and parallel or are curly)

curly or bulky (descriptors used herein for yarn that has large numbers of curved filament segments that are parts of longer filaments, that are distributed abundantly along the length of the yarn and that curve away from, and back toward, the center of the yarn, leaving open space between outer curved segments and other filaments nearer the center of the yarn)

panel (a structure which has one or more planar and/or non-planar surfaces deployed for biomass attachment with an aggregate projected area (as distinguished from specific surface) of at least 0.5, preferably at least 1, more preferably at least 2 and still more preferably at least 3 $m^2$ and which is limited in flexibility to the extent that, in its intended orientation and in the face of normal water and gas currents within a biological treatment vessel, it remains deployed)

predominant/predominantly (indicates that, in a group of things or values, a particular thing or value in that group is present in a greater quantity or has a larger value than the other members of the group, but does not necessarily represent a majority)

submerged (as applied to a biomass supporting member or panel immersed in wastewater in a zone or vessel, refers to the condition of being completely or at least mostly submerged in the wastewater, which includes the possibility of the member or panel having its upper edge "at" (precisely coinciding with or a short distance above or below) an actual or design water level)

wastewater (water containing biological and/or chemical impurities of such types and in sufficient amounts to make it desirable or essential to remove at least a portion of same, including raw or untreated wastewater and partially treated wastewater in any stage of treatment, including the final stage, until the end of treatment to remove such impurities)

BRIEF DESCRIPTION OF THE DRAWINGS

Schematic

FIG. 12 is a top view of one of the digestion tanks of FIG. 11.

FIG. 13 is a transverse vertical cross-section through the tank in FIG. 12 at section line 7/5.

FIG. 14 is an enlarged portion of FIG. 13.

Filaments and Yarns for Biomass Supports

Woven, braided, knitted, partially woven and non-woven biomass supports have been based on individual fibers or filaments, or on fine fibers or filaments gathered together by the hundreds, thousands or even tens of thousands to make threads or fabrics useful in biomass supports. See, for example U.S. published patent application 2006/0163157, JPA (Japanese Patent Application) 7-167983 and WO96/26161.

Using known techniques for making yarns, yarns used in the present invention should be formed with deviant path filaments, those which deviate substantially from straight paths through the yarns. These tend to create open space in the yarns between the filaments. To the extent necessary, crimping, kinking, twisting, tension effects and/or any other suitable technique known to persons skilled in the art of textile member manufacturing may be applied to the filaments and/or the yarn to produce an open yarn of expansive transverse cross-section. Those techniques which impart much curliness to the filaments have been helpful in creating the desired open-ness in the yarns.

Figure 15:
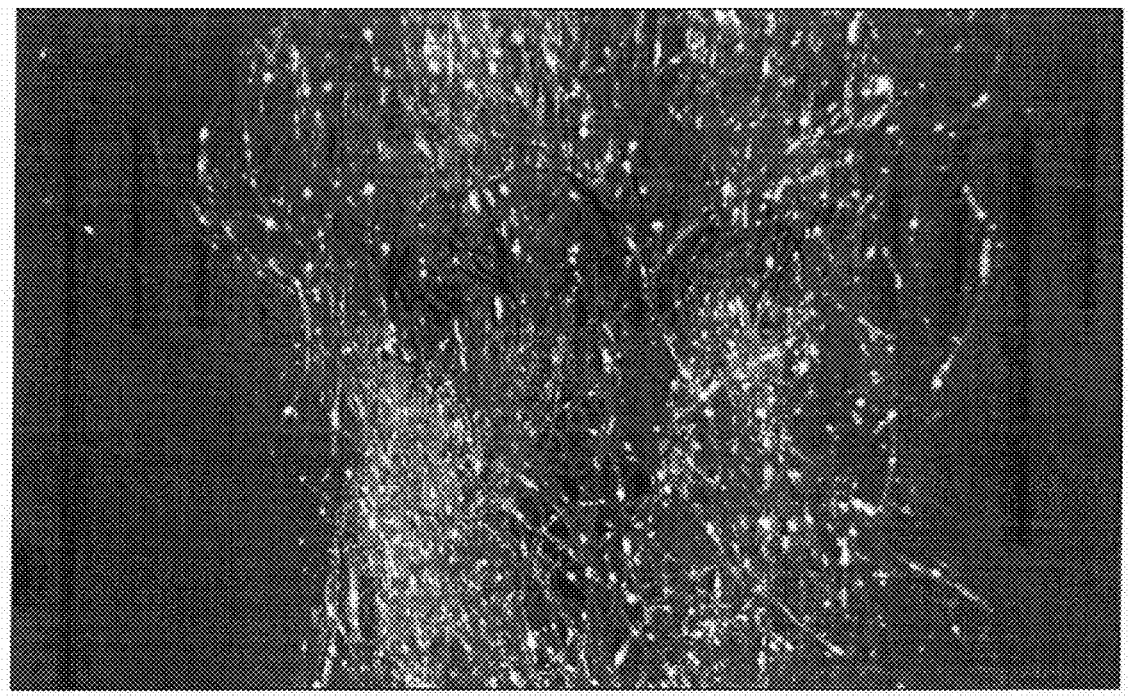
FIG. 15 is a photographic image illustrating open-ness of filaments in yarn.

For an illustration of open-ness of filaments in yarn, please see FIG. 15. This illustrative example includes open space between the outermost filaments and the remaining or inward filaments. The inward filaments may, but need not, represent a regularly- or irregularly-shaped core extending the length of the yarn and/or may also include much open space between them.

The yarns used in the invention may include filaments of different kinds, e.g., differing in width, cross-sectional shapes, lengths and/or materials and/or in other respects. One may also include in the yarns non-filaments of various widths, cross-sectional shapes, weight/density, diameter, lengths, materials and/or other properties.

Filaments of any width that are highly flexible and suitable for the above purposes may be used. The term width is used here in lieu of diameter to accommodate to the fact that filaments of non-circular cross-section can be used. It refers to the largest transverse dimension of a filament. One can for example use filaments with widths of, in microns, 5 to 150, preferably 10 to 125 and still more preferably 50 to 100. A filament width of about 80-95 microns is being used in commercial products.

The filament cross-sections may be rounded (e.g., circular or oval) or have any other useful cross-sectional shape (e.g., triangular). See JPA 07167983, [0011]. Filaments with some of the indicated shapes can be hollow, but are preferably non-hollow. Crimping may deform the cross-sectional shape of filaments in discrete segments of their length.

Multi-lobed filament cross-sections are preferred, those in which the filaments, viewed in transverse cross-section, have three or more lobes that project radially outward from a more or less centrally disposed nexus and are distributed at angular intervals about that nexus. The lobes extend length-wise in the filaments, with and/or without significant longitudinal twist.

Figure 16:
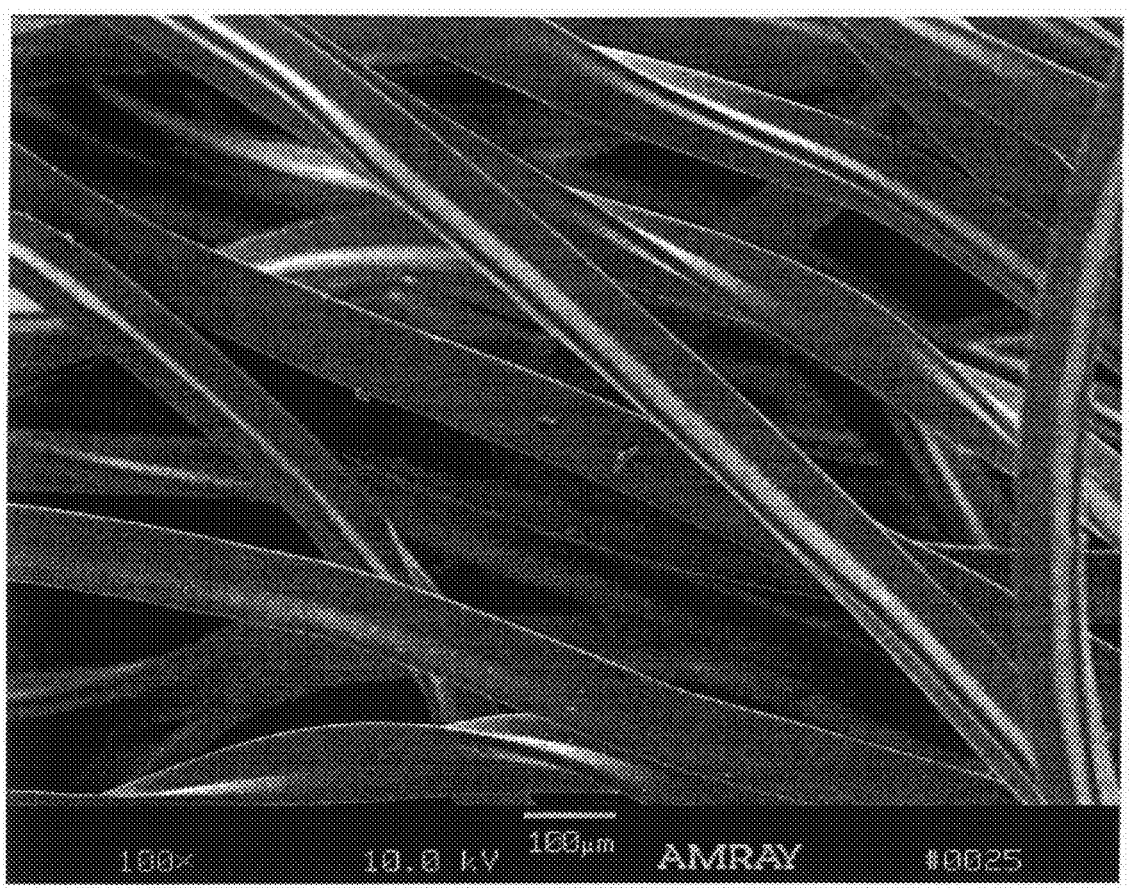
FIG. 16 is a photographic image showing filaments in yarn used in the present invention.
Figure 17:
FIG. 17 is a photographic image showing a cross-section of filament of FIG. 16.
Figure 18:
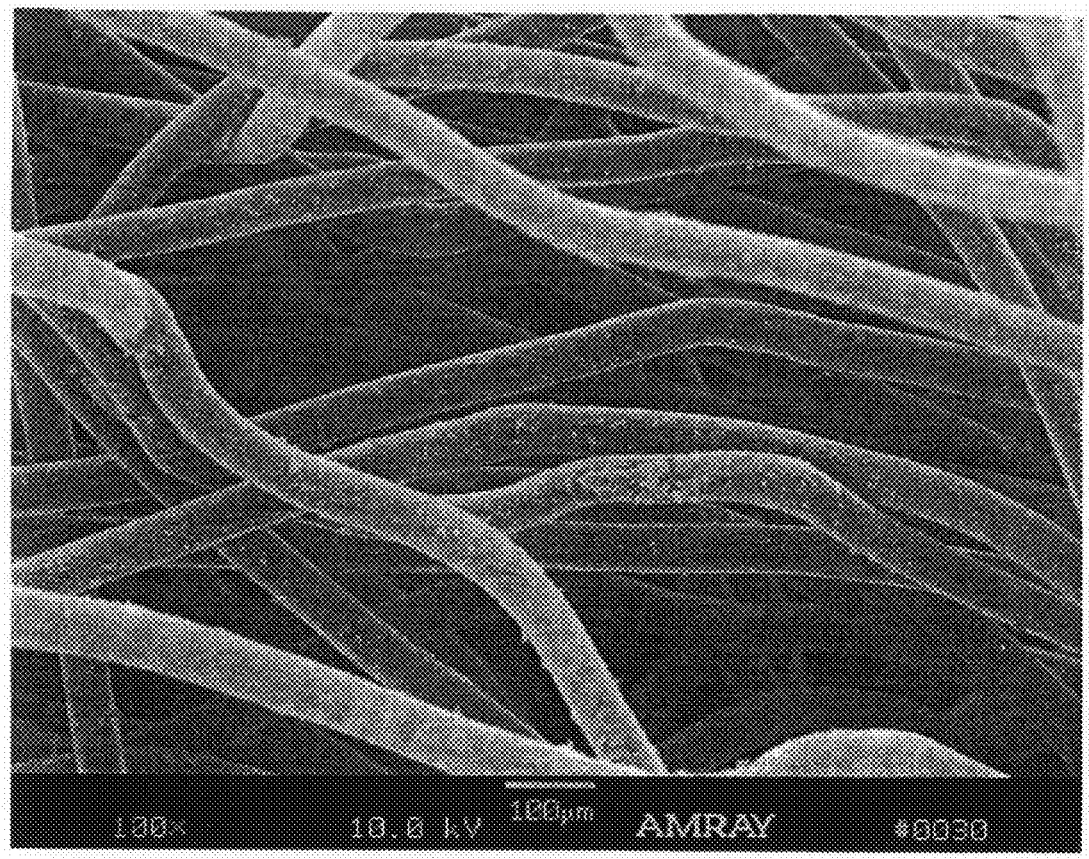
FIG. 18 is a photographic image showing filaments of more conventional prior art yarns.

FIGS. 16, 17 and 18 are, respectively, SEM (scanning electron microscope) images of preferred tri-lobe filaments, an enlarged cut end of the preferred filament and a more conventional round filament used in a prior art member.

A way of expressing the extent of kinky and curved filament deviation from straightness is by "compression ratio" $[[(a-b)/(a)] \times 100 (\%)$, wherein the length of the filament when stretched to at least near straightness without permanent deformation is (a) and the original or un-stretched length of the filament is (b)]. It is preferred that the filaments have a compression ratio of at least 5 and more preferably at least 10, with a compression ratio of about 14 being applied in current commercial products. However, it appears that while the compression ratio can range up to 70 and more preferably up to 60, a particularly preferred range is about 10 to about 30.

The following is a tabulation of data on compression ratio determinations on the preferred tri-lobe filaments of FIGS. 16 and 17 and the more conventional filament of FIG. 18:

TABLE 1

COMPRESSION RATIO DATA FOR FIGS. 16 and 17

| Sample No. | Ultimate Length | Deviant Length | Amount of Shortening | Compression Ratio | Average |
|---|---|---|---|---|---|
| Series 1-N is on filaments from JHR Biomass Support Member | | | | | .144 |
| 1-1 | 395 | 330 | 65 | .165 | |
| 1-2 | 400 | 360 | 40 | .1 | |
| 1-3 | 405 | 350 | 55 | .136 | |
| 1-4 | 415 | 360 | 55 | .133 | |
| 1-5 | 405 | 330 | 75 | .185 | |
| Series 2-N is on filaments from New Biomass Support Member | | | | | .284 |
| 2-1 | 280 | 197 | 83 | .297 | |
| 2-2 | 275 | 205 | 70 | .255 | |
| 2-3 | 295 | 200 | 95 | .322 | |
| 2-4 | 290 | 210 | 80 | .276 | |
| 2-5 | 295 | 215 | 80 | .271 | |

The yarns used in the invention may include blends of filaments differing in kind and compression ratios. However, if one selects suitable yarns on the basis of the compression ratio of the filaments they contain, it is preferred that the yarns used in the biomass support members of the present invention comprise gathered fine curly filaments comprising, on a number basis, predominantly, or preferably a majority, or at least 65 or 85%, or preferably substantially all, filaments having a compression ratio in the above-described ranges.

The filaments are preferably of synthetic material, stable in wastewater and aerated biological treatment environments and hospitable to the attachment, substantial retention and growth of biomass, including for instance carbon fiber threads, but more preferably synthetic polymeric organic material, such as polyester, acrylic, vinyon, polyethylene, polypropylene, polyvinylidene chloride, polyvinyl chloride, and polyurethane. Preferred are filaments comprising forms of the foregoing polymers which possess, or have been treated to possess, a substantial affinity for water and/or growing microorganisms. See JPA 2000055986 and JPA 10117679. However, the most preferred filament materials are polyamide polymers and especially the nylons, e.g., nylons 4, 6, 66, 9, 11 and 12. Nylon is currently preferred for commercial use based on its hydrophilic nature.

Yarns can be composed of fibers or filaments that are relatively short as compared to the length of the yarn. It is preferred that the filaments used in the invention be very long, usually more than half, more typically over ¾ and most preferably at least as long as the yarns in which they are used, based on measurements of the length of the filament when stretched only to the length that substantially straightens it and the length of the unstretched yarn. In some if not many cases, the straightened filaments will be longer than the unstretched yarns.

The overall number of filaments per yarn is preferably in the range of 10, 50 or 100 to 2000, more preferably above 130, still more preferably above 150, and may range more preferably up to 300, 450, 650 or 1,000. A preferred range applicable to current commercial products is about 160-200, i.e., approximately 180.

The yarns of the present members preferably have an average length-weighted width, in mm, of at least 3 and more preferably above 4. Particularly preferred are widths above 5.5, or 6 or 7. In a current commercial product, the width is about 7.8.

One technique that is believed useful to make suitable yarns is to form three similar strands of yarn each having a substantial number, for example 30-100 and preferably 60 each, of fine pre-crimped nylon filaments of about 80-95 and preferably 88 microns in width, and then twist these three strands together into a single 100-300, preferably 180, filament yarn which exhibits readily visible curliness and separation of outer filaments from filaments nearer its center, such as illustrated by FIG. 15. However, it is within the scope of the invention to use yarns made in other ways.

Figure 19:
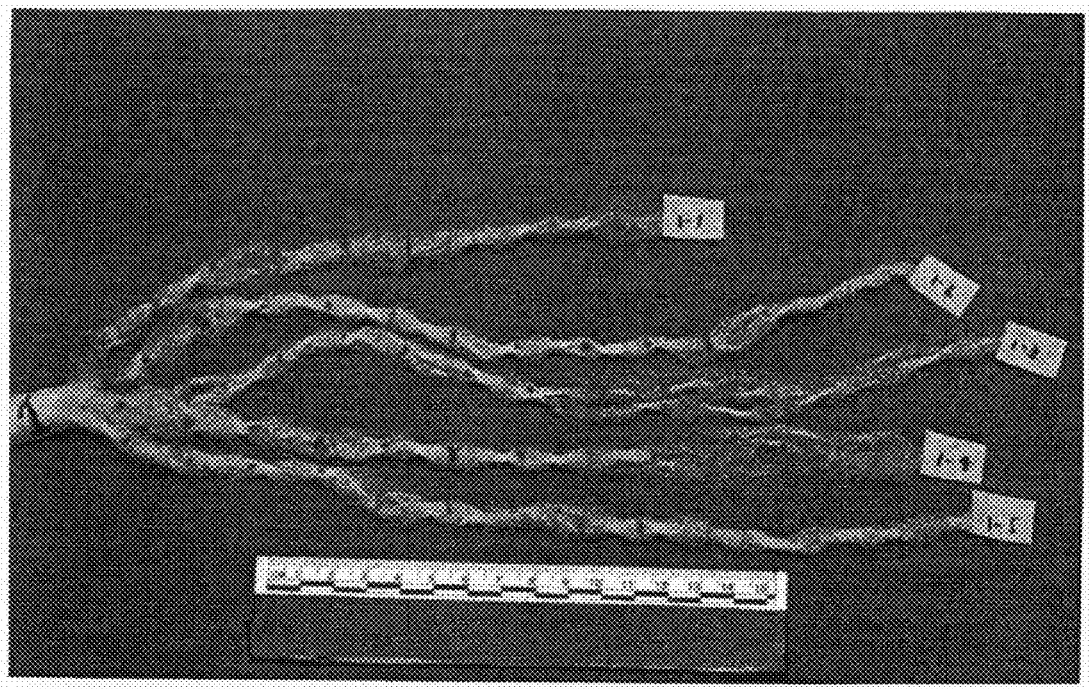
FIG. 19 is a photographic image showing yarn strands with individual regions of expanded width.
Figure 20:
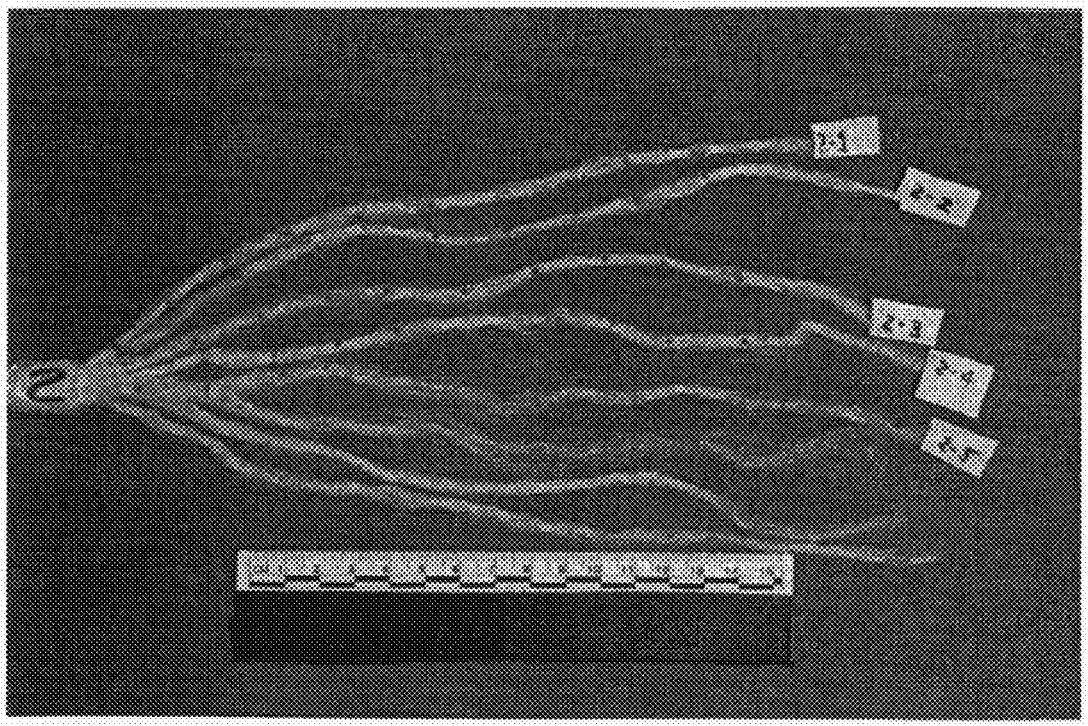
FIG. 20 is a photographic image showing yarn based on filaments similar to those of FIG. 18.

A yarn made in the above preferred manner appears in FIGS. 19 and may be compared with a more conventional yarn in FIGS. 20. The yarn used in the members of the present invention may and preferably does have sufficient filament curliness and/or twist such that it includes regions of substantially broader width (e.g., filaments puffed out) and narrower width (e.g., filaments more closely gathered) distributed along its length, as may be seen in FIG. 19. In general, because the yarn filament spacing is considerably larger in the puffed out regions, the average width of most of these expanded regions will usually substantially exceed the average length-weighted width of the yarn overall, for example by 50%, 60%, 70% or more. In this preferred embodiment the width of some of the individual expanded regions represents up to 150%, or 200% or more of the average yarn width. Without wishing to be bound by any theory, it is believed that these puffed out regions, when present, assist in satisfactory operation of wastewater treatment processes employing such members, by providing sites particularly hospitable to biomass attachment and that more closely gathered regions of a given yarn, when present, and adjacent narrow regions of adjacent yarns, assist in penetration of the members by water, thereby facilitating delivery of dissolved oxygen from the water to biomass within the members made with such yarns.

The expanded regions may or may not vary in length within the same yarn and overall. The majority of them may have lengths of, for example 0.5 to 5, preferably 1 to 3 and more preferably 1 to 2 cm. This can be seen in FIG. 19. The black marks on the yarn of FIG. 19 are not part of the yarn as produced. Rather, they were added to indicate length intervals of 2 cm in the yarn when straightened without stretching.

Individual regions of expanded width may or may not have greater cross-sectional area than the average cross-sectional area for the yarn along its length. The yarn may have, within its cross-sections of greater and lesser width, cross-sections of varying shape.

Due to the irregular widths that can be exhibited by open curly filament yarns and to the presence, in at least some embodiments of the invention, of regions of varying width, distributed or randomly distributed along the length of those yarns, which regions may vary substantially from one another in length, a length-weighted method of determining average yarn width may be needed in some cases.

The measurements used in this method can be made through stereoscopic microscopic examination of yarn. Where necessary to compensate for yarn cross-sections varying irregularly in regions of varying length along the length of a yarn, one may for example take 8-10 or more image width observations within regularly spaced "stations", e.g., 2 cm apart, along the length of each of 5 yarn specimens. These should be selected, to the extent possible, to include samples representative of yarns of broader, intermediate and narrower width, with the end stations being separated by several cm from the ends of the specimens. Stations that are approximately 2 mm long, along the lengths of the yarn samples, have been used, with the observation for each station including the widest and narrowest yarn widths observed within that station. Observations are best made at that magnification at which the full yarn width is fully visible but substantially fills the field of view.

Figure 21:
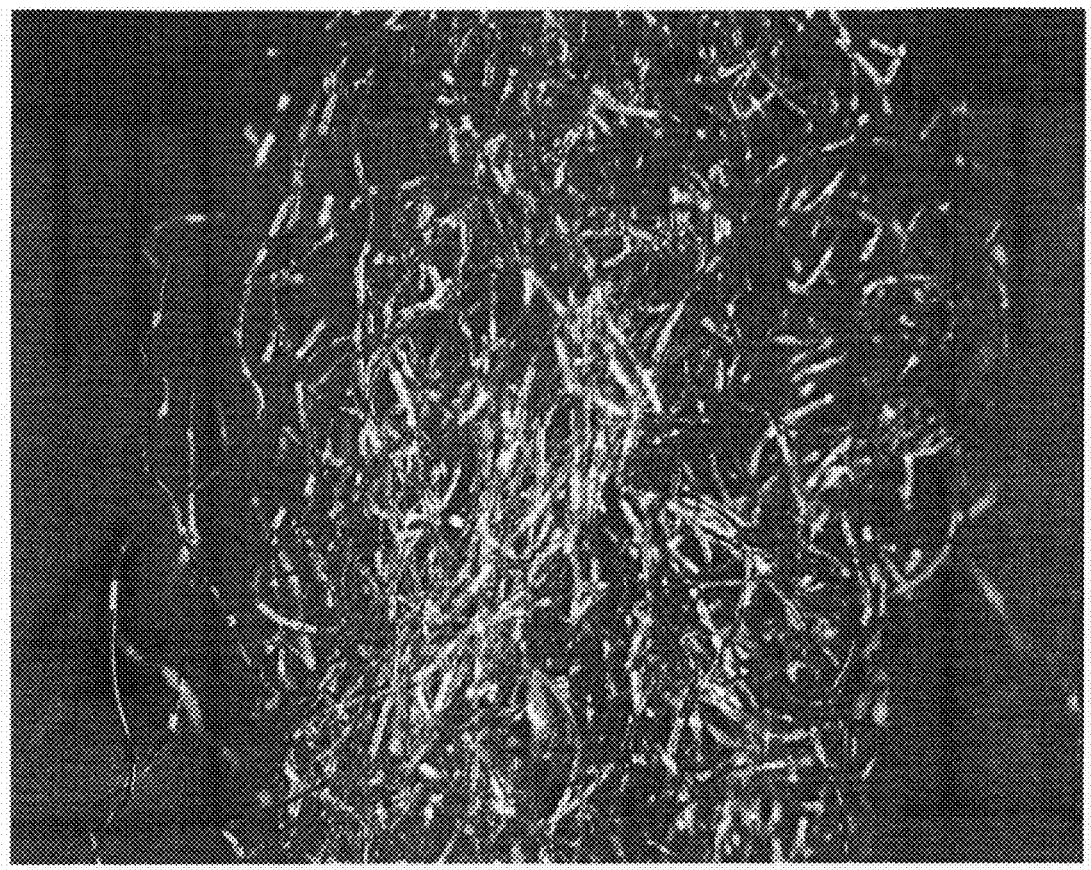
FIG. 21 is a photographic image showing some conventions which can be applied in taking yarn width measurements from photomicrographs.

FIG. 21 illustrates some conventions which can be applied in taking yarn width measurements from photomicrographs. For example, one may exclude from observed yarn width those filaments that "wander off into space", and single filaments which extend laterally well beyond all other filaments (e.g., at least about ⅙ of the remaining image width), as in the lower right corner of FIG. 21. One may however include within a measured width two or more closely related filaments, as in the lower left corner of FIG. 21, over the numeral 4, that extend laterally well beyond all other filaments.

The following data and calculations have been used in deriving the value of length-wtd. (weighted) width in the yarns of FIGS. 19 and 20:

TABLE 2 Length-weighted width data (in mm) for FIG. 19, a yarn used in the invention.

TABLE 2

Length-weighted width data (in mm) for FIG. 19, a yarn used in the invention.

| Measurement Station No. | Yarn Sample Number 1 | Yarn Sample Number 2 | Yarn Sample Number 3 | Yarn Sample Number 4 | Yarn Sample Number 5 |
|---|---|---|---|---|---|
| 1 | 4-8 | 8-10 | 9-10 | 5-6 | 8-9 |
| 2 | 3-4 | 10-14 | 5-7 | 6-7 | 7-9 |
| 3 | 8-11 | 4-5 | 5-8 | 6-6 | 4-6 |
| 4 | 10-14 | 5-6 | 5-7 | 7-8 | 5-6 |
| 5 | 5-7 | 6-7 | 6-8 | 5-6 | 10-12 |
| 6 | 10-12 | 7-8 | 5-5 | 7-9 | 7-8 |
| 7 | 5-6 | 4-5 | 5-5 | 7-8 | 6-9 |
| 8 | 6-7 | 5-6 | 10-17 | 8-10 | 9-10 |
| 9 | — | 6-7 | 10-16 | 8-14 | 6-8 |
| 10 | — | 7-9 | 11-14 | 15-18 | 6-7 |
| Ranges of image widths | 3-14 | 4-14 | 5-17 | 5-18 | 4-12 |
| Avg. of all mean image widths for each sample | 7.5 | 7.0 | 8.4 | 8.3 | 7.6 |
| Length-wtd. apparent area ("A") of each sample, mm² | 44.2 | 38.5 | 55.4 | 54.1 | 45.3 |
| Length-weighted avg. area of FIG. 19 yarn | 47.5 mm² | | | Length-weighted avg. diam. of FIG. 19 yarn | 7.76 mm |

TABLE 3

Length-weighted width data (in mm) for FIG. 20, a yarn used in the prior art:

| Measurement Station No. | Yarn Sample Number 1 | Yarn Sample Number 2 | Yarn Sample Number 3 | Yarn Sample Number 4 | Yarn Sample Number 5 |
|---|---|---|---|---|---|
| 1 | 3-4 | 4-5 | 3-6 | 3-3 | 6-8 |
| 2 | 4-6 | 5-7 | 5-7 | 3-4 | 6-8 |
| 3 | 4-6 | 5-7 | 5-7 | 3-4 | 5-6 |
| 4 | 5-6 | 5-6 | 6-8 | 4-6 | 4-6 |
| 5 | 4-5 | 4-4 | 5-6 | 7-8 | 6-6 |
| 6 | 5-7 | 3-3 | 4-8 | 5-6 | 6-8 |
| 7 | 4-5 | 5-6 | 4-4 | 7-8 | 6-8 |
| 8 | 4-5 | 4-7 | 4-5 | 4-6 | 6-7 |
| 9 | 4-5 | 5-6 | 4-5 | 4-6 | 5-6 |
| 10 | 5-6 | 4-4 | 6-6 | 4-5 | 5-6 |
| Ranges of image widths | 3-7 | 3-7 | 3-8 | 3-8 | 4-8 |
| Avg. of all mean image widths for each sample | 4.8 | 5.0 | 5.4 | 5.0 | 6.0 |
| Length-wtd. apparent area ("A") of each sample, mm$^2$ | 18.1 | 19.6 | 22.9 | 19.6 | 28.3 |
| Length-weighted avg. area of FIG. 20 yarn | 21.7 mm$^2$ | | | Length-weighted avg. diam. of FIG. 20 yarn | 5.24 mm |

With calculations based on information from the foregoing images, it is possible to calculate an approximate value for the open-ness of a yarn. The calculation is based on the ratio, in a given yarn, of two different kinds of cross-sectional areas.

One of these areas, (a), is the portion of yarn area the filaments would be expected to fill in the yarn cross-section if they were not spread apart in the yarn. The other, (A), represents the cross-sectional area of the open yarn. The value for open-ness, calculated in this manner, identified herein as Aa, is the quotient of "a" divided into "A".

Calculation of A for the new and old support member yarns may be based upon an open yarn cross-sectional area value for that yarn. For purposes of this disclosure, this area is determined with the aid of the width of the yarn, derived from microscopic image measurements, such as those reported in Tables 2 and 3, above.

In the case of yarns exhibiting significant variations in both image width and cross-sectional shape along their lengths, accuracy in the computation of "A" is promoted by using a length-weighted average value of width, also as illustrated above. An absolutely precise cross-sectional area would be difficult to measure in a yarn of this character. However, with a large number of width measurements, at least 48 having been taken for each yarn in the present case, a reasonable approximation of yarn cross-sectional area "A" is believed to result from application of the formula $A = 3.14 \times (W/2)^2$, wherein W is the length-weighted average width of the yarn images.

The value of "a" for a given yarn is related to the number of filaments it contains and the space occupied by an average filament. As filaments used in synthetic polymer based yarns are usually extruded, their cross-sections are of reasonably uniform width and shape along filament length. In the simplest case, where essentially all filaments in a yarn are of a uniformly circular cross-section and of the same diameter, it is reasonable to conclude that the space they occupy in the yarn cross-section, "a" equals 3.14 times N times the square of the radius of a single filament where N is the number of filaments in the yarn under investigation. Filament diameters can be established from SEM photos, for example FIG. 18. Where filaments of varying diameter are present in the yarn, number-weighted average diameter and radius values can be used in the calculation. Effective radii can be calculated for other rounded cross-sectional shapes.

For the old members, an average filament diameter of 55 microns or 0.055 mm and radius of 0.0275 have been taken. With this data, from which a filament area "a" of 0.3086 was calculated, along with the value of A (21.7) from Table 3 and a filament count of 130 filaments per yarn, Aa for the old yarn has been calculated as 70.

Determining "a" for a multi-lobe cross-section, such as that used in the preferred embodiment, proceeds on the understanding that with rare exception, the lobe of a given filament will rarely invade the space between the lobes of an adjacent filament. For such invasions to occur to a material extent would require adjacent filaments to have their central axes in alignment over substantial portions of their length, which in this case appears unlikely due to the curled and twisted nature of these filaments. Thus, the calculation is based on the premise that the average multi-lobed filament will, essentially, "defend" (prevent invasion of), and therefore occupy, a triangle formed by lines connecting the extremities of its lobes. The length of a side of the average triangle can be measured and its area calculated, e.g., from SEM photos. See, e.g., FIGS. 16 and 17. The product of multiplying the area so determined and the number of filaments in the yarn yields "a".

For purposes of the present calculation, the length of a side of the triangle is assumed to be equal to the number-weighted average apparent widths of the filaments on SEM examination. On this basis, the average of the lengths of the sides of the triangular areas was determined to be 92.5 microns or 0.0925 mm. The average area of these triangular areas was calculated as 0.003589 mm$^2$ on the basis that, on average, they corresponded to isosceles triangles. Using this area, a filament count of 180 filaments per yarn and the value of A (47.5) from Table 2, Aa for the new yarn has been calculated as 73.5.

Although yarns with lesser values than these of Aa can be employed in the present invention, it is preferred to employ yarns in which Aa is at least about 45 and more preferably at least about 50 and still more preferably at least about 60. In principle, aside from the need for the members to be of sufficient strength to support the weight of biomass and to have sufficient resistance to stretching to prevent their collapse upon themselves, matters that can be determined without undue experimentation, there is no upper limit on Aa. However, it is contemplated that in most applications of the invention, values of up to about 90, or up to about 100, or up to about 110 will serve adequately or very well.

Biomass Support Members and Panels

Certain prior art biomass support members comprise threads in the form of open structure elongated yarns running generally in a common direction in crowded relationship, being held together at three, four or more intervals of yarn length by elongated cross-supports that extend across the yarns in regions that represent a minor proportion of total yarn length. Within repeating intervals of length between the cross-supports, there are yarn length segments that include in the aggregate a major proportion of total yarn length and are free to sway in response to liquid and gas currents when submerged in an aerated liquid medium such as wastewater. WO 02/079104 discloses members in which some yarns can sway and others may merely limit the length of the members in the direction of yarn length. However, adjacent yarns are not contiguous, in the sense that curly filaments of adjacent yarns overlap one another. The present inventions are believed to be improvements over these prior art systems.

In a general aspect, the present inventions comprise elongated flexible masses of thread members comprising open-structure bunched biomass-supporting elongated yarns running generally in a common direction. These masses, when lying on a flat horizontal surface and not stretched, have a general thickness of at least 20, more preferably at least 25 and more preferably at least 30 cm, which exceeds the average length-weighted yarn width of the respective yarns. Also, these masses have an expanse of length and width such that their length and width are each at least 15, preferably at least 30 and most preferably at least 40 times their general thickness. The yarns of the masses are held together at two, three, four or more intervals of yarn length by cross-supports extending across the yarns in regions that represent a minor proportion of total yarn length. In these intervals, the yarns are free to move with respect to one another in one or more, and preferably all, directions radial to yarn length and still more preferably are substantially free of connection to adjacent yarns to afford a swaying action in response to liquid and gas currents when submerged in an aerated liquid medium such as wastewater.

The inventions disclosed herein also include the foregoing general aspect in combination with any one, or with any combination of, the additional and preferred features described below and in other portions of this disclosure.

In preferred embodiments the members are composed predominantly of many generally parallel, crowded, overlapping bulky biomass-supporting yarns of the kind described above, arranged in three-dimensional arrays. In these arrays, all yarns may be alike, or some, preferably a minority of, different kinds of yarns may be present, differing for example in filament properties (e.g., different degree of curliness of filaments), materials, average diameter, length, resilience (degree of resistance to stretching), stiffness (flex resistance) and purpose.

The support members of the present invention are basically flexible, preferably highly flexible, partly or wholly textile members or non-textile elements, e.g., the yarns are not inter-woven with threads or yarn in the cross-supports. The members may include rigid or non-rigid cross-supports. One of their purposes is to bind multiple biomass-supporting yarns together at longitudinally spaced locations (at locations that are spaced in lengthwise directions along the lengths of the yarns). They also assist, at these spaced locations, in crowding the yarns to establish radially overlapping disposition among adjacent yarns in one or more radial directions (relative to their length) when the members are hung or otherwise supported in a straightened (stretched or un-stretched) condition.

Cross-supports may be of any suitable materials or construction, e.g., yarns. Filaments or yarns may be woven or otherwise engaged with biomass-supporting yarns into bands (which may for example include net-like open bands or tightly woven "closed" formations, which is preferred). At the spaced locations, cross-supports may be formed in media by weaving, knitting, stitching, braiding or other suitable method. However, in other types of support members the biomass supporting yarns may be secured to strips of plastic film and/or fabric, or to rods or bars, at the spaced locations, e.g., by stitching, thermal or solvent welding or any other kind of bonding, including gluing. Also, the biomass supporting yarns may be secured between clamps comprising, for example, rigid bars having faces between which the yarns are gripped and laterally or radially compressed and crowded.

The cross-supports are angularly disposed relative to the yarn direction, preferably perpendicular thereto. But they may be at other angles, preferably at an included angle (between the yarn direction and cross-support direction) of 30 to 90 degrees but preferably more than 45 degrees.

Woven cross supports are preferably of relatively high tensile modulus and strength and of any suitable width, e.g., 2-10 cm, but preferably no wider than necessary for adequate strength. One method of making media with woven cross-supports is to run a wide expanse of many laterally crowded yarns lengthwise through a loom as warp yarns. For example, about 400-700, 450-650 or 550-600, and preferably about 580-595 yarns per meter of eventual product width can be fed. The wide expanse of yarns progresses through the loom for extended distance intervals, e.g., on the order of 30 cm, without any weaving taking place, i.e., no cross (weft) threads are inter-woven with the yarns within these intervals.

Then, intermittently, at the end of each such interval, a short band of relatively high strength and high tensile modulus weft thread is woven cross-wise relative to the yarns, through and across all of the advancing yarns. These short woven bands, which can be on the order of 6 cm long measured along the length of the yarns but extending across the full width of the expanse of yarns, are the cross-supports. The resultant woven material support members are referred to as "media".

Whether the cross-supports are made as above or in other ways, parallel biomass-supporting yarns are free to move laterally in yarn length intervals between the cross-supports. More particularly, they are free to move in one or more, and preferably all, directions generally radial to the yarn length. Such freedom preferably exists over substantial portions of the length of these intervals, or over most of or their entire lengths between the cross-supports.

Preferably, the cross-support spacing is such that a predominant number of the yarns mounted in these microbe support members have intervals of yarn length which are at least about 20 to 50 or more cm long and preferably about 25-30 cm long, and within which intervals of length the yarns are preferably substantially free of restraint in directions radial to the yarn longitudinal axes, it being understood that such substantial freedom is not inconsistent with such restraint as may be exercised on the yarns by biomass when biomass is accumulated thereon and by adjacency to other yarns.

Preferably, the foregoing yarn length intervals have cross-supports at each end and two or more cross-supports may be provided in each member. For commercial products with woven cross-supports, the media can be produced as a long, continuous running length of stock material having at least hundreds of cross-supports and free yarn intervals, and appropriate lengths can be cut from this stock material to make biomass support panels described below.

Figure 1:
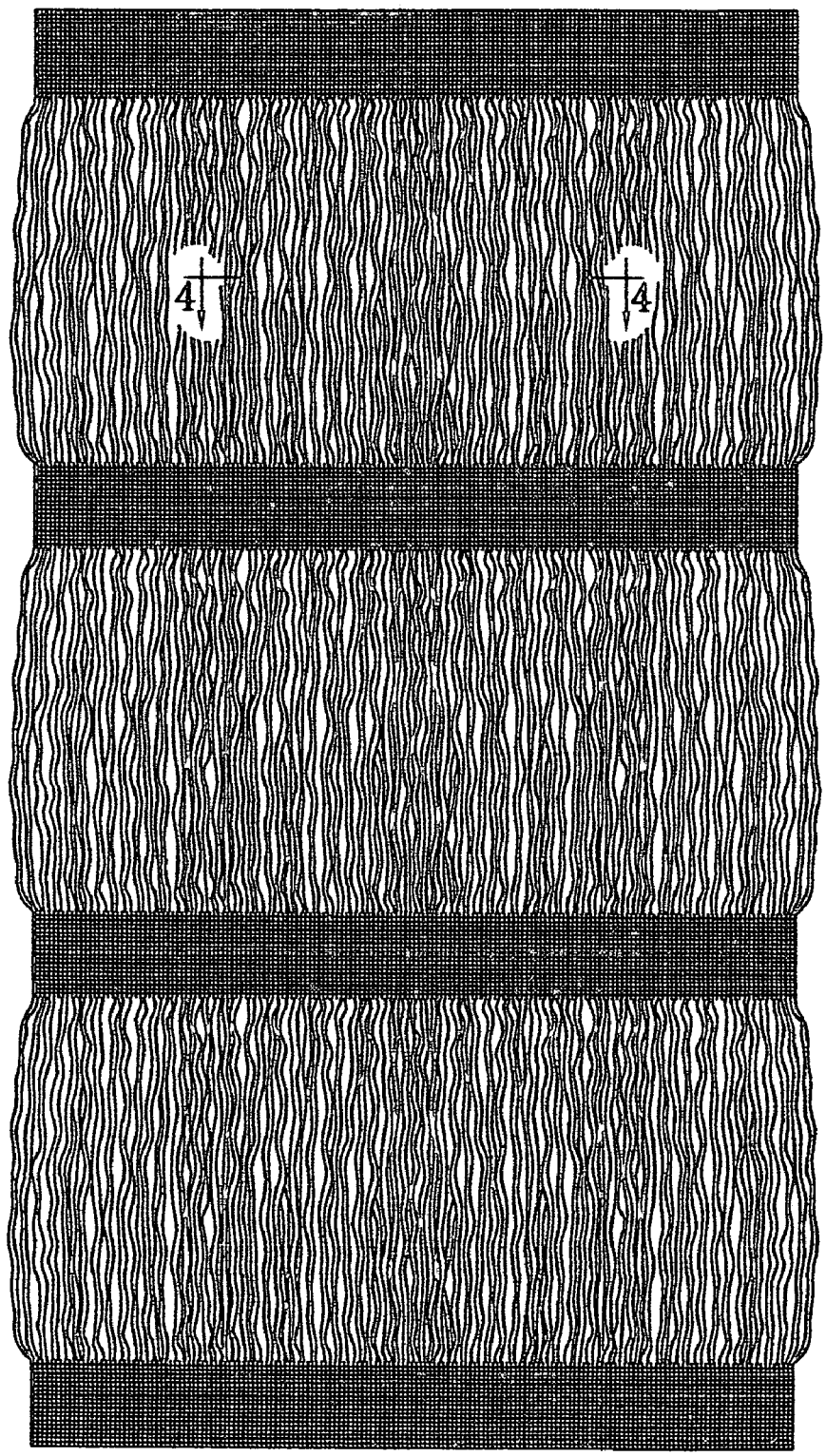
FIG. 1 is a schematic representation of a portion of a biomass support member according to the invention.

FIG. 1 is a representation of a portion of a support member according to the invention, which in this case is media. In this view, the media has four cross-supports with three intervening intervals of free yarns. This view must be regarded as schematic, i.e., it is not possible in a line drawing of this scale to show in detail the appearance of the yarns or to show both foreground yarns and background yarns in detail.

Figure 2:
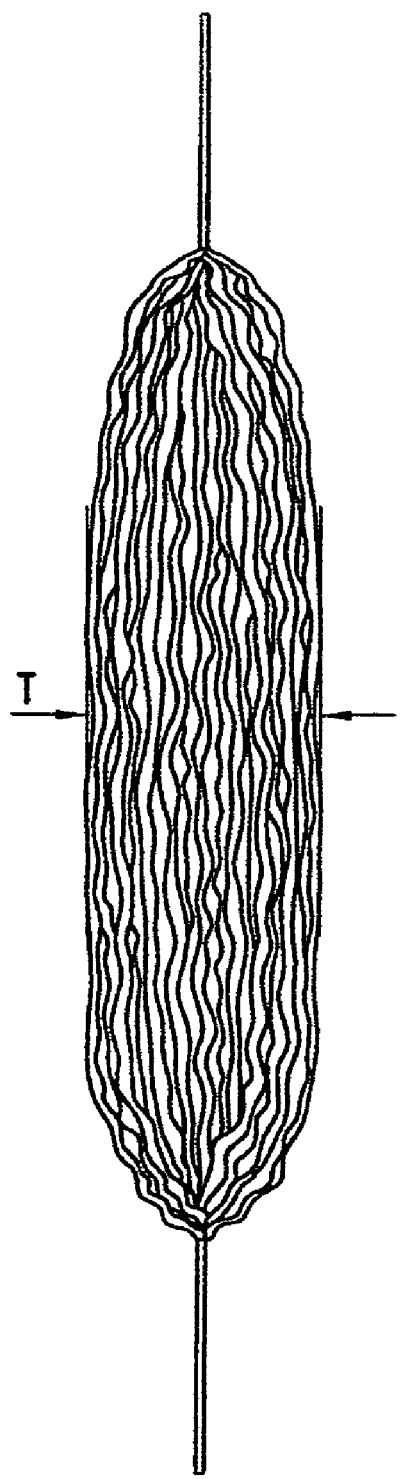
FIG. 2 is a partial side view of the member of FIG. 1.

Within the yarn length intervals between the cross-supports, it is preferred that there be a sufficient number of bunched adjacent yarns to impart a general thickness value "T" to the dry and clean or unused support member. Thickness T is illustrated in FIG. 2, a partial side view of the media type support member of FIG. 1.

One can enhance the value of T by, for example, using bulkier yarns and/or increasing the bunching of the yarns. Increased bunching and the desired thickness may be achieved by compressing the yarns radially in the locus of the cross-support. This allows many yarns with aggregate widths exceeding that of the member to be included in a given width of a member. This brings about an overlapping of adjacent yarns which is manifested as a support member thicker than the average width of the yarns of which it is made.

The yarns can be secured in or to the cross-support as a single layer, which in the case of some types of woven cross-supports would cause the compressed yarn portions, viewed in transverse cross-section, to appear in a straight line as substantially a single "layer" in a common plane. However, if desired, the yarns can be bunched in the cross-support in more than one layer or in arrays without clearly defined layers, with or without compression. For example, in a plural layer arrangement, the compressed yarn ends might appear in a sawtooth pattern. Increasing bunching in these and other ways affords opportunities to increase support member thickness using the same or larger width yarns, or achieve equivalent thickness with narrower yarns.

Figure 3:
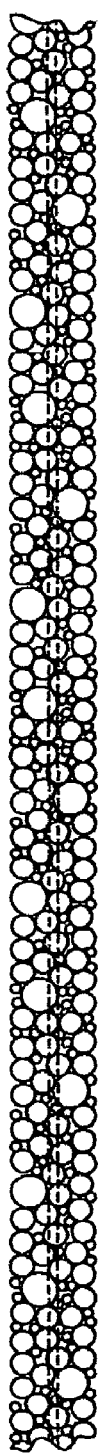
FIG. 3 is a hypothetical transverse cross-section of the yarns of a member that has approximately flat faces when hanging vertically.
Figure 4:
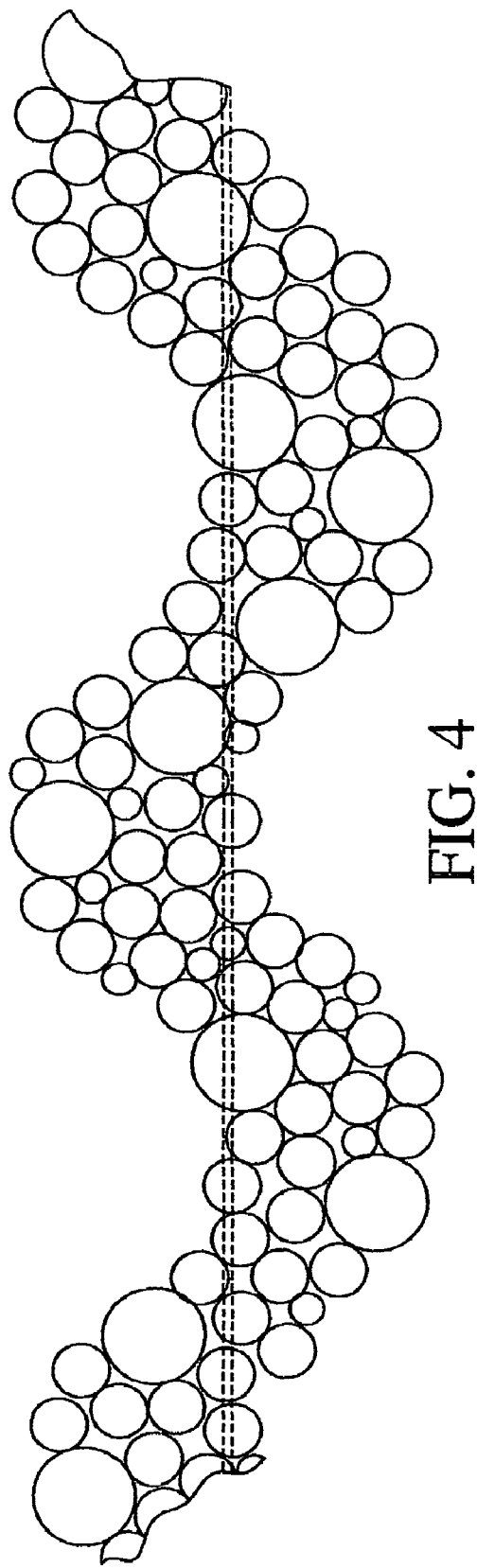
FIG. 4 is taken from a similar vantage point as FIG. 3, along section line 4-4 of FIG. 1.

Schematic FIG. 3 is a hypothetical transverse cross-section of the yarns of a support member, in this case media, that has approximately flat faces when hanging vertically. However, see schematic FIG. 4. It is taken from a similar vantage point as FIG. 3, along section line 4-4 of FIG. 1, but illustrates the fact that in at least some preferred embodiments of the present invention the faces of hanging support members will not necessarily be flat. The figure depicts a member having thickness in the above numerical ranges, composed of highly bunched, large width yarns with puffed out regions of filaments at regular or irregular intervals along the yarns. In practice, where there are irregularly spaced larger and smaller diameters along the lengths of the yarns and heavy bunching of these types of yarns to achieve large thicknesses, the variation of thickness from yarn to yarn as viewed in a given yarn cross-section will be quite prominent, as the schematic indicates. Also, in these circumstances, the faces of the support member may be of irregular shape, e.g., they may take on a serpentine appearance. For this reason, the value of T used herein is "general thickness", determined in a manner that establishes face to face thickness without regard to the irregularities in surface shape that may occur in hanging.

Measurements of T are taken with the support member lying on a flat surface and with the yarnsegments in an approximately straightened but no more than slightly stretched state. It is preferred that T, when measured in this manner, will be substantially at least 20, or substantially at least 25, or substantially at least 30 mm (with the current best mode being considered to be substantially 35 mm). These values of T are satisfied if the average thickness present over at least the majority of the width and length of the "free" yarn segments is approximately within these ranges. For the preferred support member sample discussed above and illustrated in FIGS. 16, 17 and 19, T is about 35. For the prior art support member sample depicted in FIGS. 18 and 20, T ranges from about 9 to 14.

For a support member of substantially the same thickness throughout the width and most of the length of the free thread segments, these measurements may be readily taken between adjacent cross-supports that are weighted down and held parallel to one another with the edge of the support member at the edge of a flat, low-friction supporting surface of contrasting color. A transparent ruler can be placed next to each sample and moved along the edge of the sample to find the point of maximum support member thickness that could be found when sighting perpendicular to the yarns across the top of the sample with the "zero" position of the ruler corresponding to the level of the highest elevation that could be seen in the foreground and background. The thickness can then be read from that point on the ruler scale coinciding with the top of the supporting surface.

Still more preferably, within the free yarn length intervals, it is preferred that "Tw", the ratio of the thickness of dry and clean or unused support member (in mm in an approximately straightened but no more than slightly stretched state) relative to yarn width (in mm) is substantially at least 3, or substantially at least 3.5, or substantially at least 4 (with the current best mode being substantially 4.5). T is measured as described above. Average length-weighted width "w" is used here rather than diameter because it is believed less subject to errors induced, in preferred embodiments of the invention, by irregular variations in yarn cross-sectional shape over shifting and irregular length intervals. For the preferred support member discussed above and illustrated in FIGS. 16, 17 and 19, the value of Tw is about 4.5. For the prior art support member depicted in FIGS. 18 and 20, Tw is about 2.7.

The support member is "hydraulically open", that is, water can flow from one face of the support member, when laden with biomass, to biomass in the interior of the support member, and in the most preferred embodiments will flow all the way through the support member and out the other support member face. This was not expected, given the bulky character of the yarn and the fact that there is minimal spacing between the overlapping yarns when the faces of very slightly stretched support member are examined visually on a line of sight perpendicular to those faces. "Lt" values, average light transmission through dry, unused support member, illustrate the relatively dense character of this support member, as compared to the prior art support member of FIGS. 18 and 20.

Light transmission values can be established in an essentially dark room in a test rig comprising, for example, a Velleman Components Model DVM 1300 luxmeter positioned at the bottom center of an essentially opaque 36 cm high cylindrical enclosure with a 26 cm diameter closed top having a centered 9 cm diameter top aperture. A 115 volt, 60 hz, single phase halogen 40 watt visible spectrum output lamp, positioned 23 cm above and in alignment with the centers of the aperture and meter sensor, can be used to direct radiation normal to and through support member samples. It is recommended to test five random sites on each sample, the samples being flat and relaxed or only slightly stretched, and to average the results.

Preferably, Lt for the present invention is less than 70, preferably less than 65, more preferably less than 60 and most preferably less than 55. Results for tests on the new support member of FIGS. 16, 17 19 and prior art support member of FIGS. 18, 20 are reported in Table 4, below.

TABLE 4

| | LIGHT TRANSMISSION ("Lt" VALUES FOR NEW AND OLD SUPPORT MEMBER) | | | | | |
|---|---|---|---|---|---|---|
| Run # | 1 | 2 | 3 | 4 | 5 | Average |
| Baseline | 00.1 | 00.1 | 00.1 | 00.1 | 00.1 | |
| Old Support Member | 74.0 | 68.5 | 82.4 | 68.4 | 67.9 | 72.2 |
| New Support Member | 51.2 | 48.3 | 48.6 | 47.8 | 47.7 | 48.7 |
| Open | 393 | 402 | 403 | 395 | 393 | 397.2 |

Imparting to support member composed primarily or exclusively of hydrophilic yarns, one, more or all of the above-described preferred properties will generally assist in attaining improved water absorption capacity "Wm", which refers to the ratio of weight of water (W) absorbed per unit weight of support member (m). Two support member samples, one corresponding to FIGS. 16, 17 and 19, having the above-described preferred properties and composed substantially of hydrophilic nylon filaments, the other corresponding to FIGS. 18 and 20, composed of polyester filaments, were tested for water absorption capacity. At room temperature (21 deg. C.), the samples were separately weighed, dipped in water for one minute, laid flat upon a horizontal screen for up to five minutes until water stopped dripping from the sample and weighed again. Results appear in the Table 5 below, which show that Wm for the new material was approximately 50% greater than that for the prior art material (100.times.5.5/3.7=149%).

TABLE 5

WATER ABSORPTION DATA FOR OLD AND NEW SUPPORT MEMBER:

| Sample | Size (cm) | Dry Wt. (g) | Wet Wt. (g) | Absorbed (g) | Wm (g/g) |
|---|---|---|---|---|---|
| Old: FIGS. 18 and 20 | 10.2 × 27.9 | 11.00 | 51.83 | 40.83 | 3.7 |
| New: FIGS. 16, 17 and 19 | 10.2 × 26.7 | 11.51 | 74.93 | 63.42 | 5.5 |

Preliminary testing suggests that imparting to support member combinations of one, more or all of the above-described properties will assist in attaining in the support member a value for "Wa", biomass attachment weight capacity (dried weight) per unit weight of clean support member, of at least 0.8, more preferably at least 0.95, still more preferably at least 1.1 and most preferably at least 1.2.

This expectation is based on screening tests conducted using the above test procedure on samples of dry, unused support members of the same projected area and indicated weight, made from filaments of 3 different indicated synthetic polymers. After exposure to summer biomass growth conditions for 3 months in the same tank, drying for 2 hours at 104 degrees C. and weighing, the dried biomass weights were recorded and the ratios of such weights to support member sample area were calculated and recorded in the table below.

TABLE 6

"Wa", BIOMASS ATTACHMENT WEIGHT CAPACITY

| Support Member Sample Material | Sample Projected Area (sq cm) | Sample Weight (gr) | Sample + Dried Biomass (gr) | Wt., Attached Biomass (gr) | Ratio, Bio-mass Wt. per sq meter | Ratio, Wt. Bio-mass to member weight |
|---|---|---|---|---|---|---|
| Polypropylene | 4500 | 194 | 301 | 107 | 238 | 0.552 |
| Polyether | 4500 | 167 | 343 | 176 | 391 | 1.054 |
| Polyamide | 4500 | 178 | 419 | 239 | 531 | 1.343 |

In order that the above-described flexible support member can be particularly suitable for attachment, retention and growth of biomass in aeration, they may be deployed in the form of panels, as above defined. The requisite limited flexibility can be imparted to the support member by a variety of devices to which the support member is attached, ranging from simple frames to more complex but in some cases more economical arrangements which will be discussed below in connection with illustrations of related wastewater treatment plants.

Thus, for purposes of the present invention, a panel is a combination of support member with other structure that holds the support member deployed in a relatively stable and spread out condition in its intended orientation and shape, and in the face of normal water and gas currents within a wastewater or other type of biological treatment vessel. However, "stable" as employed herein embraces controlled swaying of the support member in the panel in a preferred manner to be described below.

While generally planar panels are preferred, the panels may be of any suitable shape, and thus represent structures which have one or more planar and/or non-planar surfaces deployed for biomass attachment. The aggregate biomass-supporting projected surface area of panels may vary quite widely, but most will have an aggregate projected area (as distinguished from the specific surface of the support member) of at least 0.5, preferably at least 1, more preferably at least 2 and still more preferably at least 3 m$^2$. Illustrative panel sizes include, e.g., 1.5-4.5 m high, 1-2 m wide and at least 20, 30 or more preferably substantially 35 mm thick.

The following are some of the panel shape-defining members of any suitable type that may be used to hold the biomass support member or yarns in place in generally planar (preferred) or non-planar (e.g., curved or other) configurations in a biological treatment vessel under conditions of hydraulic flow, including any turbulence normally produced therein.

For example, the support member can be fastened in rigid, semi-rigid or moderately flexible surrounding frame members. One of many possible examples is the simple frame shown in FIG. 5, which is a front view of a biomass support panel comprising a frame similar to a window screen frame as a shape-retaining member for the biomass support member. Frame members, when used, can in turn be inserted and secured in a treatment vessel, e.g., in frame-receiving channels at the vessel walls.

But frames are not required. The support member without frame members can be fastened to connecting members (e.g., sockets, hooks, clamps or other fastening devices) secured in the treatment vessel and held by these connecting members in a spread out condition. Where the cross-supports are rigid members, they may interact with connecting members and/or other devices to aid in the flexibility limiting function.

A typical panel will contain a large plurality of the above-described yarns and two, three, four or more cross-support members per panel, extending transversely (which includes perpendicularly or at another angle) relative to the yarn direction. However, embodiments can be visualized in which the yarn members can be fastened directly in a frame without additional cross-supports. In such case, elements of the frame become the cross-supports for the yarns.

Figure 5:
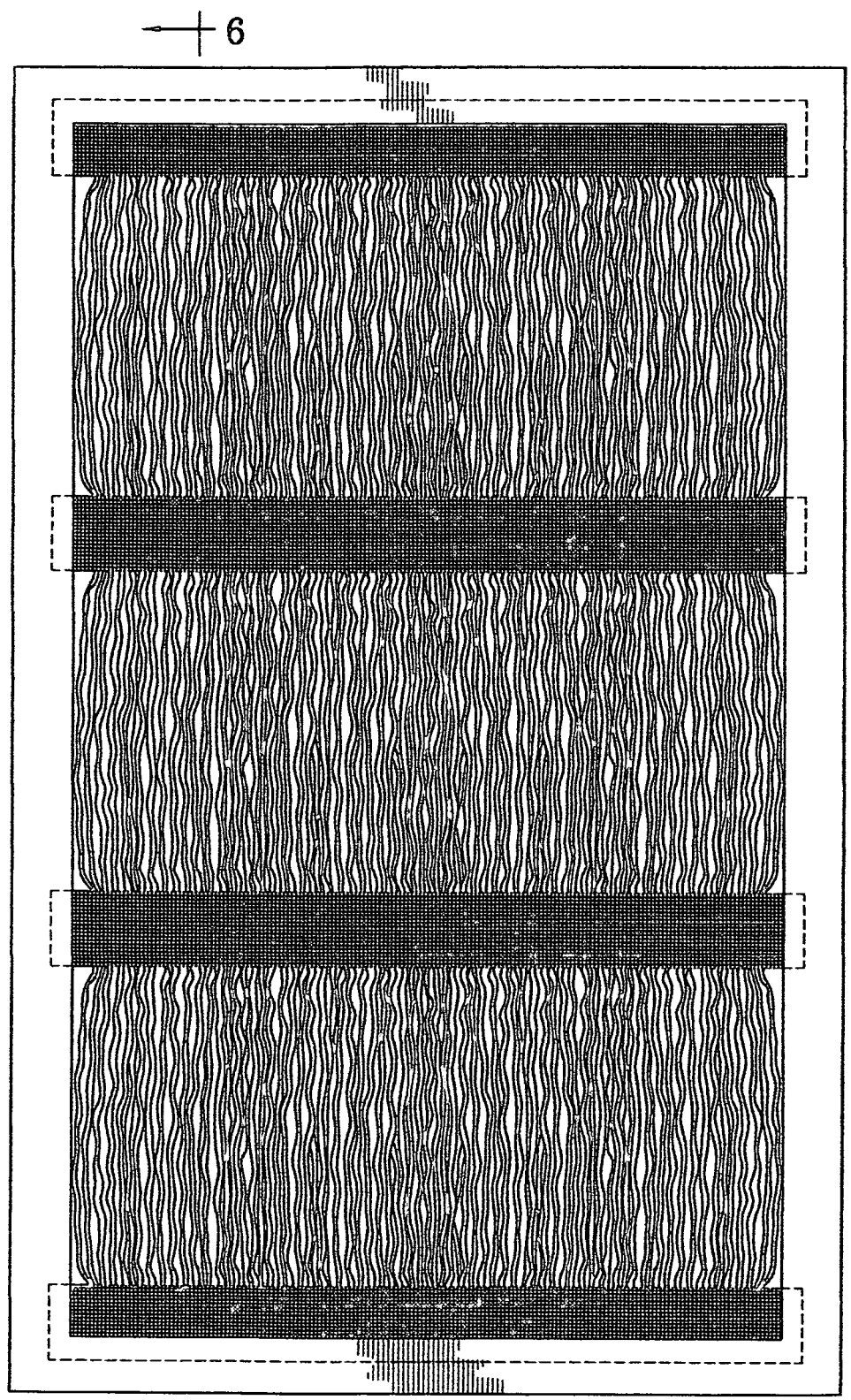
FIG. 5 is a front view of a biomass support panel.
Figure 6:
FIG. 6 is a vertical cross-section through the panel of FIG. 5.

According to a preferred embodiment, the yarns are mounted in the panels with lengthwise slack to afford controlled swaying of the yarns along their lengths in response to upward hydraulic currents in the treatment vessel. This is illustrated by FIG. 6, a vertical cross-section through the panel of FIG. 5, perpendicular to the plane in which FIG. 5 is taken, illustrating the presence of slack in the support member, as mounted in the panel.

Values of slack, "S", may be expressed as the ratio of two distances. One of these is the direct distance "d", between the ends of relaxed segments of the yarn used in making up the panels. This distance should be distinguished from the length of the indirect path that can be and preferably is followed by the yarns in a panel when passing from one end of such a segment to the other end. The other distance, "D", is the distance between the ends of these yarns when stretched.

More particularly, slack is defined herein as "d" divided into the amount by which "D" exceeds "d" [S=(D−d)/d]. One can measure the d value of a segment with it lying relaxed and reasonably straight on a flat, smooth, low friction surface. One can measure the D value of the segment while pulling lengthwise on it while it is separate from the support member and other yarn segments, e.g., with sufficient manual pull to fully extend it in a straight line without permanently altering the length it had prior to stretching. Measured in this manner, "slack" as used herein is the same or very similar to the unused stretch potential of individual support member yarn segments.

Table 7 below illustrates determination of the value of S for the yarns used in a preferred panel of a woven media type support member.

TABLE 7

DETERMINATION OF THE VALUE OF S

|  | Yarn 1 | Yarn 2 | Yarn 3 | Yarn 4 | Yarn 5 |
|---|---|---|---|---|---|
| "d", mm | 210 | 212 | 210 | 220 | 210 |
| "D", mm | 300 | 295 | 290 | 300 | 295 |
| D − d | 90 | 83 | 80 | 80 | 85 |
| S = (D − d)/d | .43 | .39 | .38 | .36 | .40 |
|  |  |  |  | Average | .39 |

Although panels having yarns with lesser values of S can be employed in the present invention, it is preferred to employ panels in which the support members, prior to their installation in the panels, comprise at least a predominant number, more preferably at least about 60%, 75% or 85% on a number basis, and still more preferably substantially entirely, of yarns with slack S which is at least about 0.25, preferably at least about 0.30 and more preferably at least about 0.35, with about 0.4 being currently most preferred. In principle, aside from the need for the support member to have sufficient resistance to stretching when in use in the panels to prevent their stretching to the point of collapse upon themselves or bowing outward into interference with adjacent panels, matters that can be determined without undue experimentation, there is no upper limit on S. However, it is contemplated that in most applications of the invention, values of S of up to about 0.6, or up to about 0.7 or up to about 0.8 will serve adequately or very well, where panel spacing is adequate.

If the yarns are in place in the support member in a relaxed state with the support member being in a reasonably straight state, whether lying on a flat surface or hanging vertically, some portion but not all of their S value, their stretch potential, may be "realized" or used up by factors extant before any biomass is on the panels. For example, yarns near the surfaces of thick support members in panels, by virtue of such yarns being bowed out to a greater extent in a radial direction and traveling a longer path lengthwise through the support member than the filaments within, may have diminished or partially utilized stretch potential. If those yarns that travel relatively longer and shorter distances have been installed in the panel under similar tension, traveling this longer path may cause outer yarns to use up or realize a portion of their stretch potential in excess of the realization manifested in yarns nearer the mid-point of the support member panel thickness.

A portion of the potential stretch may be used up if the support member is slightly stretched in the direction of yarn length in making up a panel. However, depending on whether and, if so, how much of the stretch potential is used up in this manner, the unused, clean and dry support members may or may not exhibit the "droop" seen in FIG. 6. This droop is most likely to appear in panels when the proportion of the total stretch potential, if any, that is consumed by installation factors is very small, or there has been no stretching during installation, and the support member is heavily laden with heavy, aqueous biomass. Until the support member is so laden, it could, depending on its design, have an appearance more like that seen in FIG. 2.

The yarn may be installed in the panels without stretching, but stretching is considered acceptable and may be important with some forms of support member. When the support member is stretched in installation in panels, the stretch potential used in panel make-up is preferably controlled. For example, at least 20%, more preferably at least 50% and still more preferably at least about 65% of the stretch potential is preserved or retained. About 70% of stretch potential is retained in current production of panels. The amount of unused stretch potential should be at least sufficient that the support member in the panels will be able to stretch further when laden with biomass, and thus develop the capacity to sway in hydraulic currents in a wastewater treatment zone. In current production, the yarns of the support member of the present invention, when installed in the panels, are in a partially stretched condition, consistent with the foregoing criteria.

In thick support members composed of curly filament-containing bulky overlapping yarns, modest to large levels of slack and resultant controlled swaying capabilities are believed to make possible enhanced biomass retention, compared to prior art support members that receive biomass oxygen requirements internally or externally to the supporting yarns or fibers.

The highly bunched nature of the yarns in these panels results in very few or insubstantial numbers of visible openings between adjacent yarns in the new, unused panels, and the aspect ratio of the yarns in such panels is preferably essentially infinity. Also, the highly bunched nature of the yarns and resultant thickness of the support member, coupled with the open-ness imparted to the yarns by the curly character of the filaments they contain, enable them to retain a large inventory of biomass despite the swaying and resultant flexing action and the sloughing off of portions of the biomass induced by hydraulic flow during aeration.

A set of yarns in a given panel may include yarns of varying length. For example, one may include some longer yarns which, when the support member is mounted in a frame or other attachment means in a vessel, will have slack in them to provide the desired biomass attachment capabilities and swaying action (sloughing, described above), and some other yarns that are highly resistant to stretching and, whether or not they are able to attach biomass efficiently, are of an appropriate shorter length to ensure that the support member, when installed, will not be over-stretched to the point of unduly reducing the desired slack in the longer yarns. Note, by way of background, that WO 02/079104 describes use of threads of varying length for safe bacteria retention.

Wastewater Treatment Process

In general the process of the invention is any biological wastewater treatment process which, in at least a portion of the process, e.g., in one or more stages or zones, the above-described support members are used to support biomass. Thus, the invention includes, for example, processes that are to some extent suspended growth processes, but include some supported growth processing. On the other hand, the invention includes processes that are to some extent supported growth processes, but include some suspended growth processing.

The process is preferably conducted in one or more zones in which biomass is supported on planar and/or non-planar stationary biomass supports comprising the above-described support members having yarns of fine bundled curly filaments and having properties as above described are mounted. Wastewater enters the process and flows from one zone to another in sequence as partially treated wastewater. Dissolved and soluble waste in the wastewater is digested by biomass supported on support members as above described, and may also be digested to some extent by suspended biomass, including floating biomass, and water is recovered from the process with reduced levels of waste therein.

Preferably, the process includes causing wastewater to be treated in one or preferably plural zones, e.g., in batch, pulsed flow or continuous fashion, in contact with panels as above described. These zones may be in one or several vessels. The overall flow of wastewater through the process is preferably sequential plug flow through the zones, preferably with circulation of wastewater within such zones. While there may be some recycling of biomass from one or more later stage(s) to one or more earlier stage(s), if there is recycling it is preferably limited to retain substantially plug flow operation.

This process includes causing microorganisms in biomass supported by the panels in the zone or zones to digest dissolved waste and/or suspended waste entering the process in incoming wastewater. To support digestion of waste, the biomass on the panels is supplied with oxygen-containing gas, e.g., air, oxygen and oxygen-enriched air, by discharging the gas into the wastewater, preferably from without the filaments of the biomass support, more preferably from without the yarns making up the support members and still more preferably from outside the biomass. Preferably the majority of the oxygen requirements, and still more preferably substantially all of the oxygen requirements are supplied from outside the filaments, yarns or biomass, as the case may be.

Aeration conditions are usually maintained in a majority of the zones, but anaerobic and/or anoxic conditions may be maintained in one or more zones continuously or at particular times. There may be any number of aeration stages and any number of desired changes between nitrifying and denitrifying conditions, consistent with the needs of the process.

It is beneficial in some forms of the process to maintain controlled hydrodynamic circulation of currents of wastewater within plural and preferably all zones or vessels. Such hydrodynamic circulation may be characterized by a range of linear velocity of oxygen-containing gas and wastewater rising adjacent and/or through the yarns of the panels. This range is bounded by (a) an upper limit that enables biomass suspended in wastewater to settle on biomass supported on the yarns of the panels and (b) by a lower level providing a pre-determined or sufficient level of oxygen in the biomass on the panels.

Preferably, in one or more zones the support members are present in panels comprising media in which there are yarns with intervals of length substantially free of restraint to afford controlled swaying of the yarns along their lengths. With the aid of the currents of oxygen-containing gas and wastewater rising adjacent and/or through the yarns of the panels, controlled amounts of biomass slough off into the wastewater in one or more successive zones while causing a substantial amount of the biomass supported in the respective zones to remain and continue growing on the panels in those zones.

Sloughing of biomass from panels may be practiced in a plurality of zones, in the majority of zones or in all zones having the panels of the invention. Maintaining layers of biomass on panels undergoing sloughing may be practiced in a plurality of zones, in the majority of zones or in all zones having such panels.

It is considered best to control the amount of sloughing, to the extent possible, to achieve in each zone a balance between the biomass required and retained in that zone to digest most of all waste entering that zone (including sloughed biomass entering from a prior zone, if any) and the amount of biomass passed to a succeeding zone as food for the biomass in the succeeding zone.

While not wishing to be bound by any theory, it appears that the presence of longitudinal slack in the yarn arrays of the support member panels, permitting the threads to sway sufficiently and to a limited extent in radial directions, assists in limiting biomass sloughing and maintenance of the desired inventories of biomass in zones A particularly preferred form of the process invention is the MSABP process, a multi-stage supported biological growth wastewater treatment process that derives significant benefits from using the above-described support members or panels to support biomass in plural zones.

MSABP Processing

In a particularly preferred aspect of the invention, the above-described panels are used as microbe supports in multi-stage activated biological processes (MSABPs) involving spatial microorganism succession and trophic hydrobiont chains. Trophic chains of microorganisms spatially segregated in zones and/or vessels provide conditions under which controlled amounts of biomass sloughed off from supported microbe populations in a succession of zones are passed downstream from zone to zone and are eaten by progressively different, usually larger and/or more highly organized, populations of microorganisms (e.g., vulture filtrators of different trophic levels) supported in the succeeding zones. Such succession can and preferably does provide purification by means of aerobic and anaerobic destructor microorganisms, together with conventional copiotrophs and oligotrophs, thus providing for high purification of wastewater from organic and inorganic impurities.

MSABP processes can be managed in such a way as to effect not only carbonaceous waste removal but also nitrification and de-nitrification. Also, it is possible to create a balance between bacteria development and Metazoa growth, whereby wastewater can be treated to satisfactory or even superior levels of effluent quality with little or no excess sludge generation and thus without the necessity for excess sludge treatment procedures and facilities.

In their most straightforward and preferred embodiments such processes treat wastewater based on a highly loaded upstream stage, progressing through one or more intermediate stages in which the loading decreases from stage to stage, to a downstream or final stage in which the load is very low. Preferably, the process operates in plug flow overall, and preferably substantially without recycling from downstream stages to upstream stages, and the mass quantity of organic matter proceeding from a given stage to the next will usually and preferably in each stage be lower than the mass quantity of organic matter entering the given stage. In this way the total organic matter under treatment, e.g., the "food" comprising organic waste and biomass carried over from stage to stage, decreases from stage to stage. The quantity of biomass maintained in succeeding stages also diminishes as the quantity of food available in successive stages decreases. As processing progresses through successive stages until there is not enough "food" for biomass growth, such growth will be negligible and there will be little or no organic or waste sludge by-product.

First Stage

In a particularly preferred embodiment, there is a first stage which preferably receives wastewater pre-screened to remove "trash" (especially inorganic and other materials that cannot be digested biologically). This is a heavily loaded log growth phase wherein waste in incoming wastewater is rapidly absorbed by and digested to a substantial extent by supported biomass in that stage.

Because the process is capable of handling wastewaters with widely varying BOD and COD levels, such limits as may be imposed by incoming waste levels tend to be influenced more by the treatability of the waste through aeration, than by process capabilities. However, for the sake of illustration only, it can be said that, depending on the nature of the waste, the process appears able to operate successfully with first stage BOD loadings varying from 50 to 20,000 mg/l and with COD loadings varying from 100 to 50,000 mg/l.

In the first stage, as in other stages, biomass is present both as attached growth biomass on the support members and as growing microbes suspended in the wastewater under treatment. Attached growth biomass concentrations of 8,000-10,000 mg/l, based on the amount of wastewater in the first stage, and suspended solids concentrations of 100-150 mg/l may for example be maintained in this stage. However, the process can operate with biomass concentrations of 20,000 or more mg/l in the first stage. Recycling of sludge from downstream stages is not required to provide an adequate inventory of biomass in the first stage.

Absorption occurs very quickly, so most of the BOD present in the incoming wastewater can be and preferably is removed from the wastewater in this stage, and the biomass therein preferably comprises most of the aggregate volatile and suspended solids found in the mixed liquor of all aeration stages. The absorbed BOD is synthesized to the cell mass of the microorganisms. The concentration of solids in the wastewater of the first stage preferably constitutes about 75-85% of the total suspended solids in all stages.

Support Members

In the first or at least one other stage of the process, preferably including a highly loaded stage such as described above, the supported biomass is supported on support member panels as described above. These are held in place in plural zones of a single vessel or plural vessels constituting successive stages of a multi-stage bioreactor under conditions of hydraulic flow, such as those produced by diffusers discharging air or other oxygen-containing gas into the wastewater near the panels. In some instances, supplemental agitators, which have been used to assist in keeping biosolids in suspension, can contribute to the hydraulic flow. As mounted in the respective zones, preferably at least a portion of the threads of at least some of the panels, and preferably at least some panels as a whole, include lengthwise slack to afford controlled swaying of the threads along their lengths in response to the hydraulic currents in the wastewater.

Preferably, the combination of such slack, the highly bunched nature of the yarns and resultant thickness of the support members, coupled with the open-ness imparted to the yarns by the curly character of the filaments they contain, enable them to retain a large inventory of biomass thereon despite the swaying and resultant flexing action and the sloughing off of portions of the biomass induced by hydraulic flow during aeration. Enough biomass should be retained to consume a substantial proportion and preferably the majority of the incoming food from the preceding stage. Biomass that is sloughed off can be and preferably is passed with a flow of partially treated wastewater to a downstream stage in which it represents food for biomass maintained on similarly or otherwise supported support members in the downstream stage.

The appropriate amount of slack may for example be expressed as an amount of slack sufficient to attain in combination the substantial inventory retention and sloughing of biomass as described under normal conditions of hydraulic flow near the support members. Calculation and ranges for slack and its preservation during panel production are described above. One will usually employ in this process an amount of slack which is within the preferred ranges set forth above and which is sufficient to attain in combination substantial inventory retention and sloughing of biomass as above described.

Intermediate Stage(s)

There may be one or more intermediate stages between the first and final stages of the process, in which the loading preferably decreases from stage to stage, leading to a downstream or final stage in which the load is very low. In most cases, as loading decreases from zone-to-zone, so will the amount of oxygen-containing gas fed to the successive zones, at least roughly in proportion to load.

There may be any number of desired stages. Where plural treatment zones are provided in a given vessel, those zones may be defined with the aid of suitable baffling or other means in that vessel. However, each zone may have its own tank, which is preferred.

An MSABP plant may for example have a total of about 3 to about 25-30 zones, more commonly about 4-24 zones and still more commonly about 5-15 zones. However, experience indicates that usually operations with about 7-15 and often with about 8-12 zones will provide the desired level of treatment and effluent of excellent quality.

In at least a portion of the intermediate stages, organic waste carried over from upstream stages, which may include untreated waste and sloughed biomass in the wastewater carried from stage to stage, is converted to new biomass and a portion is oxidized. Higher-order microorganisms in downstream stages feed on lower order microorganisms carried over from upstream stages.

Startup and Normal Operation

Any useful startup and operational procedures may be used. For startup, where the support members are new or at least clean, the zones or vessels corresponding to the plural processing stages may for example be filled with raw wastewater alone or mixed with clean water and inoculated with mixed liquor, such as from an activated sludge plant. For instance, an amount of mixed liquor representing about 5 to 10 percent of total system volume should in most cases be sufficient. During startup, oxygen-containing gas is preferably fed to each zone at a rate above the normal operational level for that zone, in order to promote relatively rapid biomass growth on the support members.

Usually, over a period of two to four weeks, the appropriate succession of microbes will build up on the support member panels in the successive zones. This occurs by a process of natural selection, since food of differing character, hospitable to the growth of progressively more advanced and/or larger microorganisms, is passed from stage to successive stage. As biomass colonies become established in the successive zones, effluent from the final zone, which will be sub-standard at the beginning of startup, will gradually improve to the point at which plant effluent quality specifications are being met.

During startup, sub-standard effluent may be discharged from the plant under a waiver and/or there may be some recycling of effluent to the first stage of the process. However, once appropriate biomass colonies have been established in the respective zones, it is preferred not to disturb the distribution of biology within the process by recycling. If there is recycling, it is preferred that it be restricted to preserve plug flow conditions, overall, in the process.

The flow of oxygen-containing gas is reduced for normal operation. Because the loading of wastes in the wastewater under treatment reduces from zone to zone in the downstream direction, the flow of oxygen-containing gas is usually progressively less in downstream zones.

Because the loading in the first stage is usually comparatively high, there will usually be little or no excess dissolved oxygen (e.g., zero or only a small fraction of a percent of DO) in the wastewater there. However, in the remaining zones, usually having lower loading levels and thus requiring less oxygen, the gas flow can be regulated to provide in each zone a significant, small excess, for example at least about 2 to 3 mg/l, of DO.

Somewhat more DO may be supplied in nitrifying zones than elsewhere. In de-nitrifying zones, usually the latter zones of the process, although anoxic nitrifying conditions will exist in portions of the biomass, such zones may also and often do contain aerobic bacteria, and the presence in those zones of small amounts of excess oxygen for the benefit of the aerobic bacteria is not inconsistent with de-nitrification and is preferred. Conversely, in mainly aerobic biomass, e.g., in upstream zones, there can be anaerobic bacteria present in the biomass.

The number and size of zones employed will vary from plant to plant, as will the presence and number of nitrifying and denitrifying zones, based on the quantity and character of the waste to be treated, and the retention time required to complete treatment to acceptable levels.

MSABP processes can operate on continuous and pulsed flows of influent domestic and/or industrial wastewaters, and on a batch basis. Although reasonably tolerant of significant variations in flow and loading under continuous flow conditions, e.g., varying from 20 to 150 percent of design capacity after initially attaining normal operation, stable flows and/or flow equalization to avoid surges in flow are usually beneficial.

It has also been found that such plants can be tolerant of long term low load operation and of shutdowns for short periods, e.g., several days. For longer shut-downs, it can be helpful to drain the vessel(s) in which the process is conducted, leaving the biomass in a static condition from which it may be re-animated upon re-starting the flow of wastewater into the plant, thereby re-filling the tanks or zones and re-commencing aeration. Operation at wastewater temperatures below 5 or 7 and above 55 degrees C. is difficult, and operation at 10-45 and more preferably 12-40 degrees C. is therefore recommended.

It has been found that as wastewater moves in sequence through plural zones, maintaining on the panels of two or more relatively downstream zones populations of microbes that differ (e.g., that are generally larger) from the populations of microbes in one or more relatively upstream zones, the populations of the downstream zones being able to consume microbes of biomass sloughed from the panels of the upstream zones, production of excess sludge by the process can be substantially restricted or eliminated. For example, a yearly average of at least about 90%, 95% or more of the sludge generated and passed from stage to stage in the process can be consumed in the process. Nevertheless, this process can be used in situations, especially in series with other treatment processes, in which it is called upon to treat only to lower levels. However, when operated to a higher level of completion of treatment, the remainder of generated sludge present in the treated water released from the last stage of the process can have a concentration in that water as small as 30, 20 or even 10 mg/l, and can thus be well below the concentrations of organic matter found in the effluents of well-run biological wastewater treatment plants of other types.

Wastewater Treatment Apparatus

The apparatus of the present invention comprises biomass support panels, as above described, that are present in one or more biological water treatment zones. Preferably there are plural series-connected water zones which may be in one or more vessels, with each vessel containing one or more zones and at least one of these zones having the support panels therein. This apparatus is particularly advantageous for performing the above-described processes.

Vessels of all kinds of materials of construction are contemplated, including natural bodies of water (e.g., in earthen and/or rock enclosures), man-made earthen lagoons (with or without liners), and tanks or other vessels (e.g., of plastic, steel or concrete). The vessels will ordinarily have floors, sides and tops closed or open to the atmosphere, and shades to protect the support members from the sun's UV radiation and, where needed, to prevent secondary pollution of wastewater, for example by algae.

The vessel may in plan view be of any suitable shape, including for example round, square or rectangular, which is preferred, but may also be circular or oval. Width and depth may be varied freely as the processing needs of the wastewater require.

The vessel or vessels will have inlets and outlets, which may for example be in the form of conduits, overflow weirs, underflow baffles or other liquid conveyances. The vessel or vessels, the zones and their liquid connections and internals are respectively configured to maintain within them a static body (e.g., batch operation with circulation) or a moving body (e.g., continuous flow) of wastewater and are preferably configured for the zone to zone flow of wastewater to be in plug flow.

Each zone may have its own tank, which is preferred. Where plural treatment zones are provided in a given vessel, those zones may be defined with the aid of suitable baffling or other means in that vessel. An MSABP plant may for example have about 3 to about 25-30 zones defined by baffles and/or tank walls, more frequently about 4-24 zones, and in most cases in a range of about 5-15 zones, and, at present, preferably about 8-12 zones.

Panels comprising biomass-supporting yarns as above described are mounted in submerged locations in one or more, and preferably most or all of the zones or vessels. One may, for any reason, provide zones or tanks without such panels. For example, in such a zone or tank, one may practice phosphorous removal. A panel-free zone or tank at the downstream end of a plant may be used to practice post-aeration or disinfection.

The bottoms of the support members, when generally upright, are preferably above, e.g., 20-80 cm, and usually about 30 cm above, the bottoms of the zones or vessels.

While the panels may be oriented at virtually any angle to the horizontal, including for example at least about 5 or 10 degrees from the horizontal, they are preferably at least substantially upright, meaning inclined up to about 45 degrees from vertical. The most preferred orientation is vertical or substantially so, with the yarns of the support members extending in any direction, but also preferably vertical or horizontal or substantially so, and most preferably substantially vertical.

Although the panels may be planar and/or non-planar, being wholly planar or wholly non-planar or including both planar and non-planar portions, e.g., circular or other arcuate forms or V-shaped, they are preferably generally planar. Plural planar and/or non-planar panels may and preferably are arrayed in groups in face to face relation, preferably with their faces in nearly or precisely parallel relation to one another, but with adjacent panels spaced apart, e.g., to permit hydraulic flow through the spaces between them.

The apparatus usually includes typical aeration gas supply system components, such as one or more blowers or compressors, air mains, diffusers, in some cases manifold(s) and/or headers, depending on the type(s) of diffusers used. Virtually any kind of diffusers can be used.

Examples include coarse bubble and fine bubble diffusers, such as ceramic, porous plastic or fabric, but preferably membrane diffusers, such as disks, panels, tubes, transverse holder types and longitudinal strip types. Most preferred are coarse bubble and fine bubble membrane diffusers, including disks mounted on elongated headers, tubes, strip diffusers and others, that can discharge bubbles in elongated patterns, and that can discharge with controlled intensity to establish appropriate biomass retention, limited sloughing and hydrodynamic circulation, as discussed elsewhere in this disclosure.

Diffusers may be mounted in and/or under groups of support member panels in any desired configuration. They are not necessarily but preferably mounted at a lower elevation in the vessel than the bottoms of the panels. To limit sloughing, the horizontal orientation of the diffusers may if desired be within or at least mostly within spaces defined by the imaginary downward projection of the faces of adjacent panels or bundles that are vertical or substantially so. In the past, it was preferred that the diffusers were for the most part disposed beneath vertical spaces between panels and that support member panels or substrates be gathered into groups called bundles between diffusers. Where bundling is practiced, the number of panels between diffuser rows, strips or other elongated patterns may for example be 2-20, preferably 3-16, and most preferably about 5-8.

However, it has been found with the present support member that it is possible to install the panels with a uniform, relatively close spacing. While doing so can place substantial numbers of panels over and near rows of closely-spaced diffusers, this affords an increased ratio of biomass capacity to tank footprint in at least the most heavily loaded vessels, and ordinarily is accomplished without excessive sloughing of biomass and with good hydrodynamic circulation.

According to an optional but preferred best mode for practicing the apparatus invention, the diffusers and panels are positioned, and the diffusers are of appropriate capacity, to induce a controlled hydrodynamic circulation within at least a portion of and preferably throughout most or all of the zones. This preferably includes upward currents of gas and wastewater between some of the panels or bundles, cross-currents above or through upper portions of some of them and descending currents in intervals of space between other panels or bundles beneath which there are no diffusers.

Surprisingly, considering the much-increased thickness of their support members as compared to prior art support members, the biomass-laden support member panels of the present invention are to a substantial extent "hydraulically open" under aeration conditions present in membrane and/or coarse bubble diffuser-equipped diffused gas aeration plants. This means that currents of water containing dissolved oxygen can pass through the support members laterally, i.e. from one support member face into the support member and biomass toward the other face, bearing oxygen to microbes within the thick, supported biomass, and can usually pass all the way through to the other face. It was not apparent that the considerably thickened support members of the present invention would both maintain a larger inventory of microorganisms for treating waste, but also keep them in a highly active condition. The hydraulic open-ness of preferred embodiments of these support members is also evidenced by the fact that the above-mentioned cross-currents and circulation occur even when the tops of the support member panels are at water level in the treatment zones.

Most preferred are gas supply systems that are adapted to supply oxygen-containing gas to wastewater in vessels and treatment zones from outside the biomass-supporting yarns and support members in sufficient amounts for sustaining metabolism of the waste matter by biomass supported on the yarns of the support members. Preferably, such gas supply systems, that supply gas externally to the yarns, have sufficient capacity to supply the entire oxygen requirements of the design waste-treating capacity of the vessel or vessels and zones.

Most gas supply systems that release bubbles from diffusers can supply adequate agitation to assist in dissolution and delivery of oxygen to the biomass and to prevent settling of suspended matter. However, where necessary or desirable, optional auxiliary agitators may be used in one or more of the zones, but in most cases these will be unnecessary. Preferably, the gas supply system's capacity, the diffusers' air output capability and patterns, the panel characteristics and the orientation of diffusers and panels are such as to provide controlled sloughing of biomass without scouring of biomass from the panels.

The panels, being based as they are on flexible yarns having portions of their length free or unrestrained against lateral motion, are limited sufficiently in flexibility to the extent that, in their intended orientation and in the face of normal water and gas currents within the biological treatment zones or vessels in which they are deployed, they will remain stable and deployed in long term operation, e.g., for at least six months and preferably for years. This may be achieved by fastening of the yarns and/or of portions of the support members containing the yarns to the adjacent, or to the completely or at least partially and sufficiently surrounding, structure of a relatively rigid member, which may for example be a metallic, wooden or resinous frame, rack, portion of the vessel structure or some combination thereof.

Where a vessel itself, including for example some part of a vessel wall, assists in limiting the flexibility of the yarn, it represents a component part of a panel. In such a case, an otherwise flexible yarn-containing support member may be secured directly to a vessel wall or a component thereof by any suitable fastener arrangement, without the involvement of frames, racks or other related types of related removable and non-removable structures. This technique, representing direct attachment of the yarns and/or of portions of the support members which contain the yarns to the vessel(s), is preferred in smaller plants. One example of direct connection is to provide a vessel with vertical walls spaced apart by slightly more than the width of the support members and, running horizontally along those walls, horizontal reinforcing ribs to which the support members can be secured by a sufficient number of properly positioned and configured fasteners which impart the properties of panels, as above described, to the support members. Such fasteners may for example be attached to any of the vessel walls, floors, roofs and/or other overhanging structures.

On the other hand, the flexibility-limiting function may be performed by fastening of the yarns and/or of portions of the support members containing the yarns to frames, racks or other at least semi-rigid structures which are at least initially separate from the vessel or vessels.

In this case, the yarns or support members may be secured in the vessels indirectly. For example, the frames or racks containing and limiting the flexibility of the yarns can be removably and/or non-removably secured in a vessel or vessels. "Secured in" is used here in a broad sense to include not only fastening such a frame or rack to some structure in or on the vessel, but also, for example, merely resting a panel frame, rack or other panel component securely in a receptacle on a vessel upper edge or on the bottom of the vessel without fastening the panel to the vessel, e.g., as is possible with heavily constructed or weighted frames or racks resting on the floor of the vessel.

Plural panels may be provided in the form of plural sections of support members mounted in individual sub-frames, a convenient number of which are mounted together in common master frames. The master frames can then be placed in treatment vessels.

However, particularly for large plants, fastening many pieces of support members without sub-frames into a large common rack is preferred. Such a rack can be designed to impart the desired limited rigidity to an array representing numerous panels.

In practice, it has been found convenient to group about 25-30 support members in one rack, but any workable number of support members can be included. Factory pre-assembly of numerous racks each containing an array of support members, which can then be shipped to a plant site, can facilitate installation of panels in tanks.

Support member frames and racks can be hung in small channels, e.g., 2 meters wide or less, or in much larger channels, secured to vessel side walls. Preferably, heavy or weighted racks merely rest on the vessel floors, but they may be fastened to the floors.

The support members used in the panels comprise wide and thick expanses of many yarns crowded together laterally and preferably in plural layers (e.g., about 600 yarns per meter of width). As described elsewhere herein, woven or non-woven cross-supports can be provided to hold the yarns of the support members together. Also, or in the alternative, the cross-supports can serve as direct or indirect support member attachment points to a vessel to keep the yarns deployed in a stable manner as generally planar and/or non-planar panels in the currents of wastewater and aeration gas present in an operating wastewater treatment tank. For example the cross-supports can be fastened to attachment devices. The attachment devices can fasten to adjoining and/or surrounding structure, e.g., tank walls, racks or frames, including individual or group frames for the support members.

The term "fastener" is used herein in a broad sense to include virtually any suitable fastening arrangement, including not only traditional fasteners such as "S" hooks, hooks of other shapes, hog type rings, bolts or screws, with or without the two operative end portions as in an "S" hook. However, "fastener" is also used in a less traditional or specific sense to include, for example, the gluing or thermal fusion of the support members to tank, rack or frame components, or the forming of channels or loops to receive a mounting bar or other structure at the cross-supports and/or at one or both ends of a section of support member and such other arrangements as will provide secure attachment.

Illustrative apparatus may be found in the following figures. FIGS. 7-10 illustrate half of a dual 12 stage MSABP plant, which may be considered typical of medium to large plants. FIGS. 11-14 show a single 8 stage "package" plant, which illustrates smaller installations.

Figure 7:
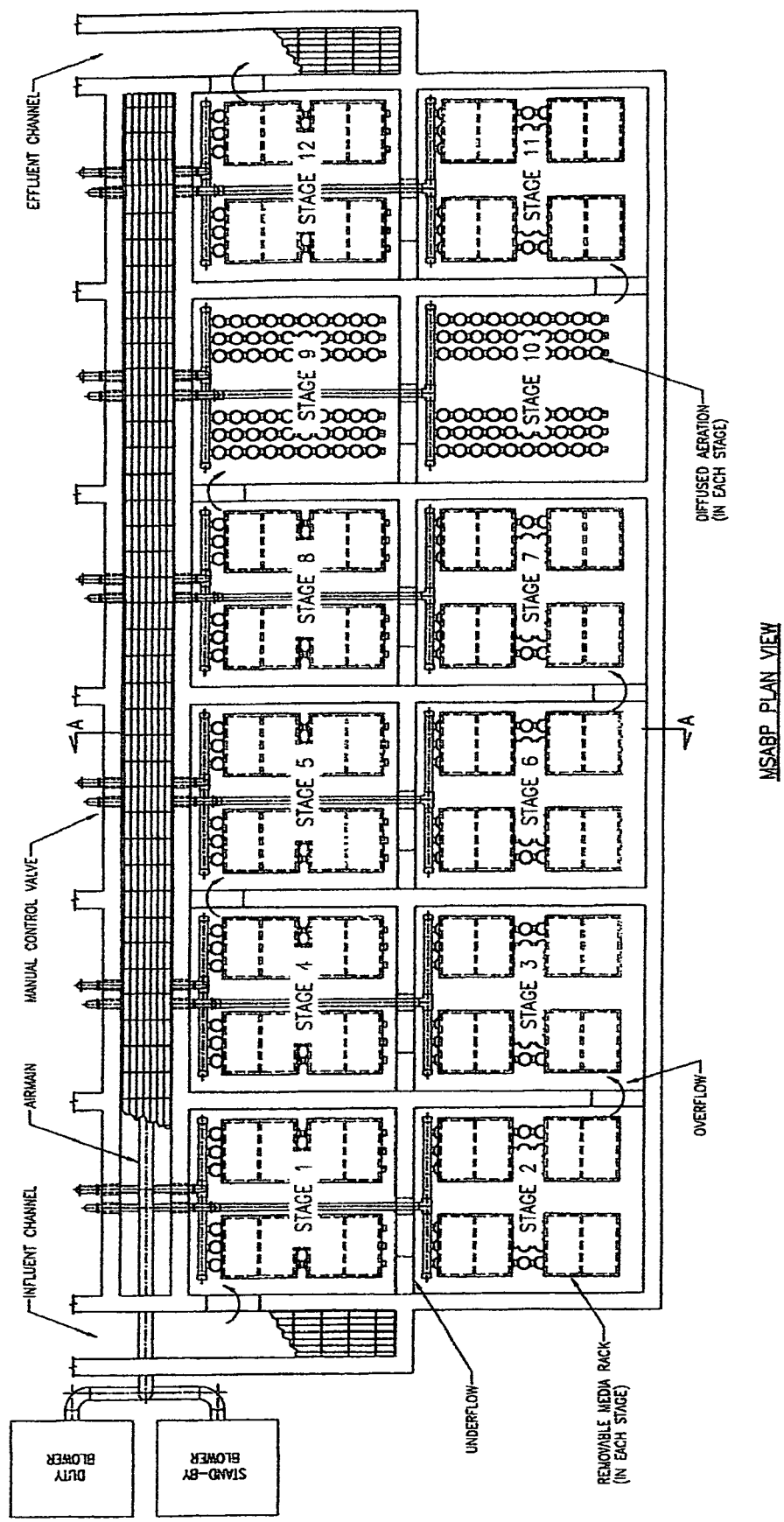
FIG. 7 is a plan view of a treatment plant with portions broken out.
Figure 8:
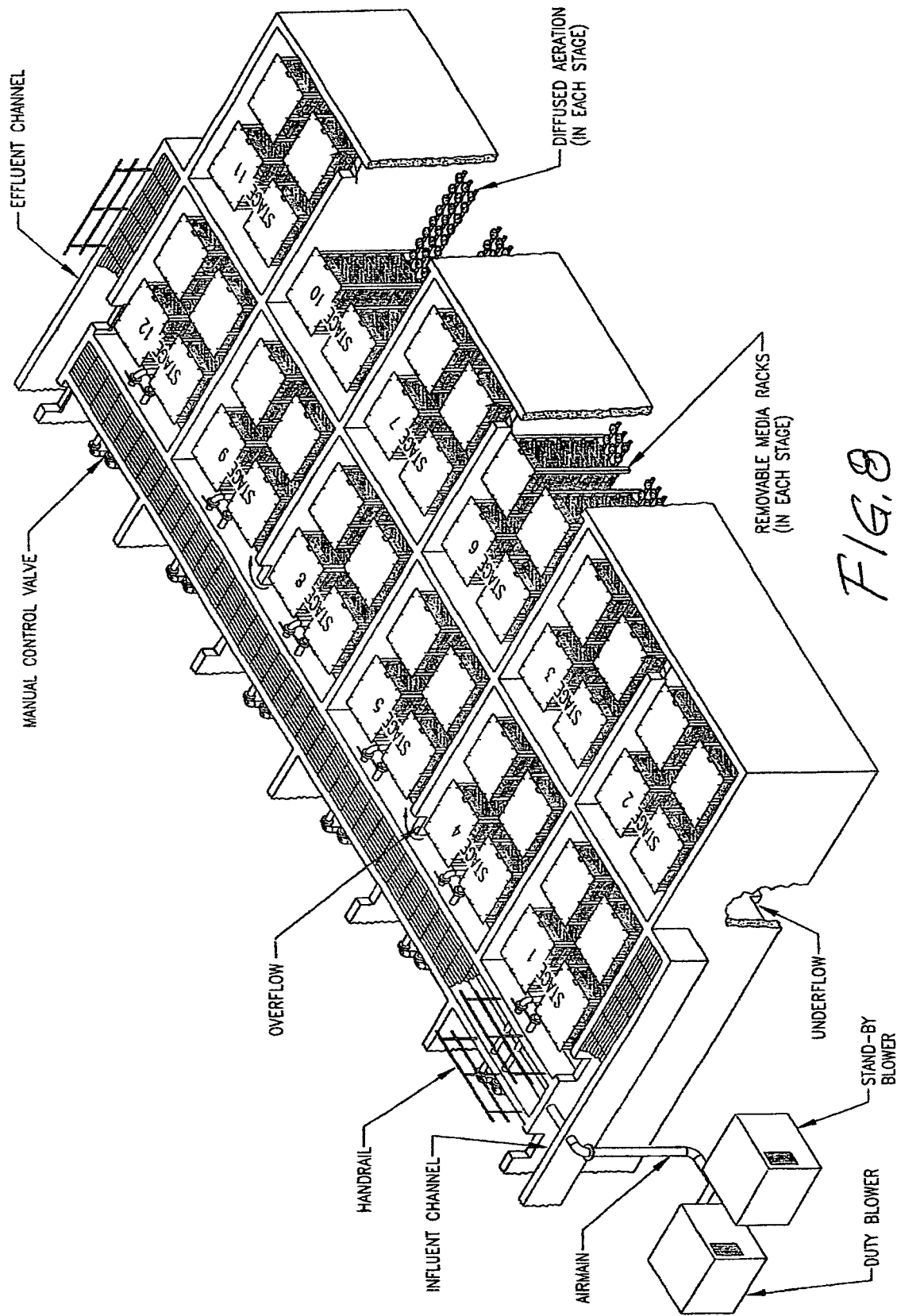
FIG. 8 is a perspective view of the plant of FIG. 7.
Figure 9:
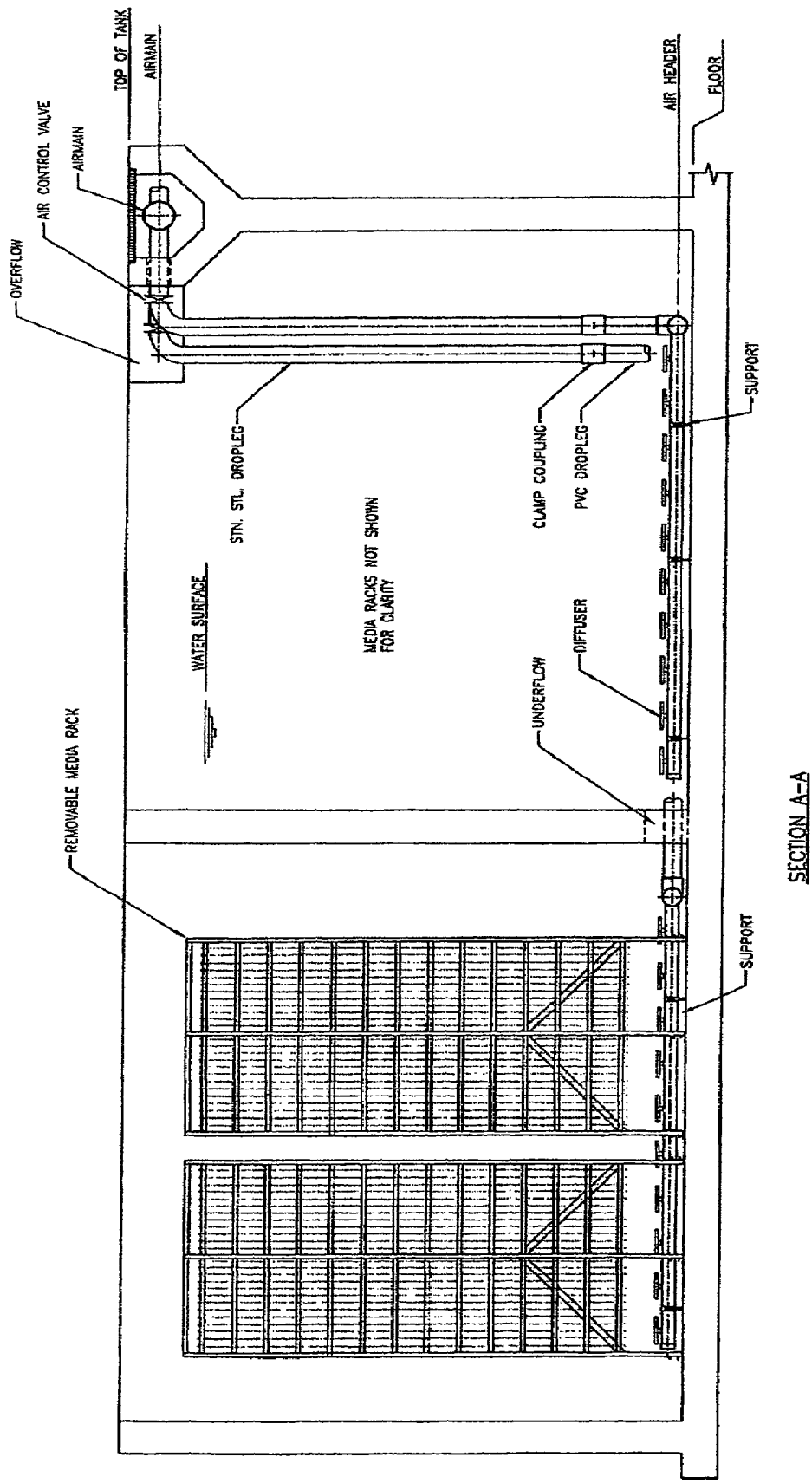
FIG. 9 is a transverse partial cross-section taken at location A on FIG. 7.
Figure 10:
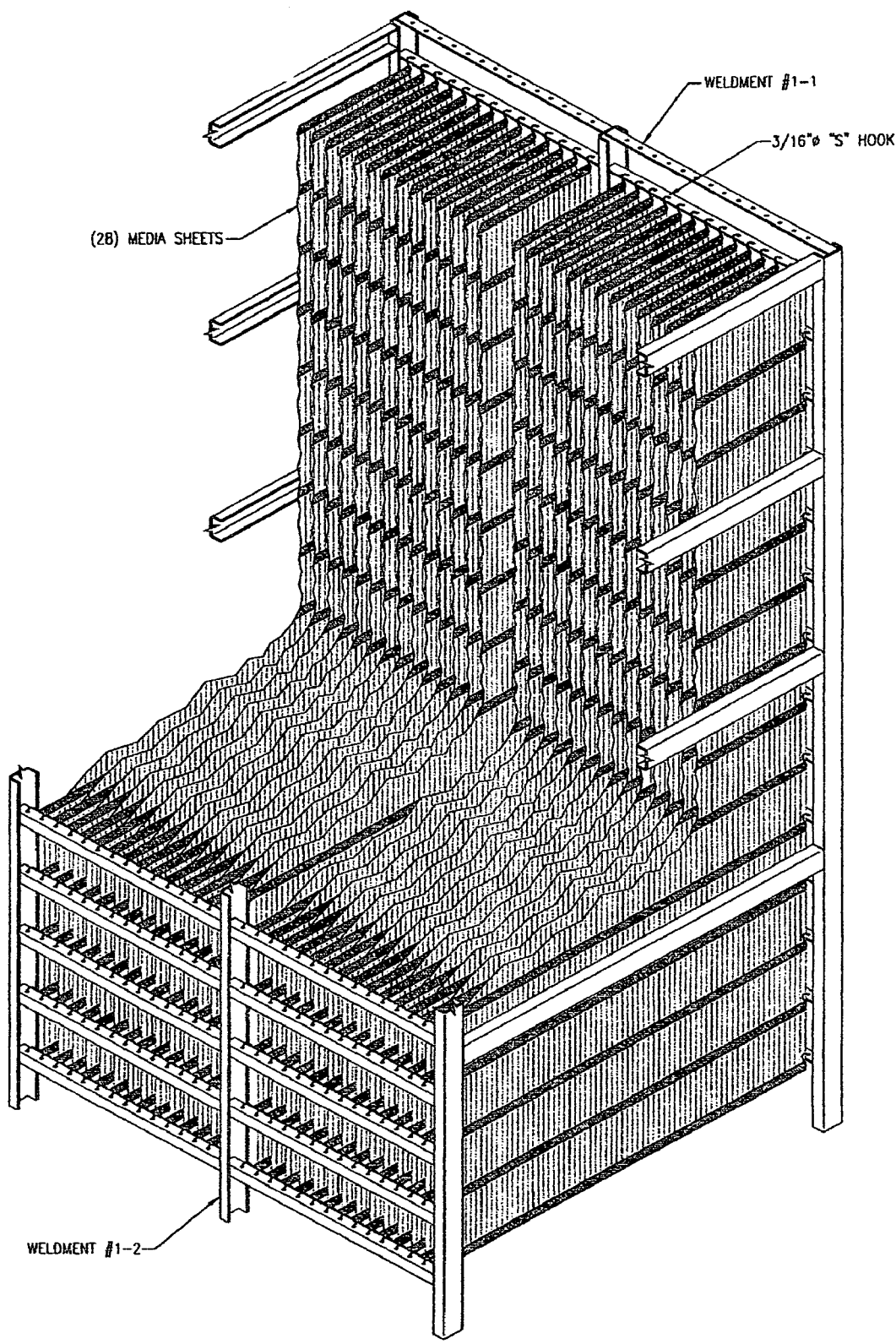
FIG. 10 is a perspective, cutaway view of a panel rack fitted with a biomass support member.

FIG. 7 is a plan view with portions broken out. It illustrates one of the two 12 stage units. Each stage has its own individual tank (stages 1-12). FIG. 8 is a perspective view of the same plant, also having portions broken out and portions removed. FIG. 9 is a transverse partial cross-section taken at location A on FIG. 7. FIG. 10 is a perspective, cutaway view of a panel rack fitted with support members, providing a plurality of panels, that can be used where large capacity racks are needed.

FIGS. 7-9 depict concrete tanks or zones representing individual treatment stages or zones. An air main leads from duty and stand-by blowers into and along the groin of a "Y" wall running between two 12 zone units, only one of which units is depicted in order that the other unit can be shown in larger scale. The unit shown comprises two rows of six tanks arranged along-side each other and the "Y" wall.

Branch lines including air control valves and drop legs lead off the air main, feeding into both the near and far rows of the six-tank sets and into air headers at the floors of the tanks. Mounted on the air headers at spaced intervals are fine bubble membrane disk diffusers disposed beneath racks of biomass supporting panels in each tank resting on the tank floor above the diffusers.

Wastewater, after trash removal or other required or desired pretreatment (not shown), enters an influent channel and overflows a weir into stage 1. Biomass on the panels of this stage absorb pollutants and digest them. Then, digested waste and sloughed biomass depart stage 1 through an underflow into stage 2, which carries out further treatment and discharges sloughed biomass, untreated waste and digestion products, through an overflow weir into stage 3. Movement of the wastewater under treatment sequentially through the remaining nine zones occurs in a similar manner. Only a very small and environmentally acceptable residue of suspended solids is present in the treated water as it exits stage 12 through an overflow weir into an effluent channel for ultimate disposition in a receiving body of water. In the foregoing procedure, underflow can be substituted for overflow, and vice versa, in the respective stages.

Figure 11:
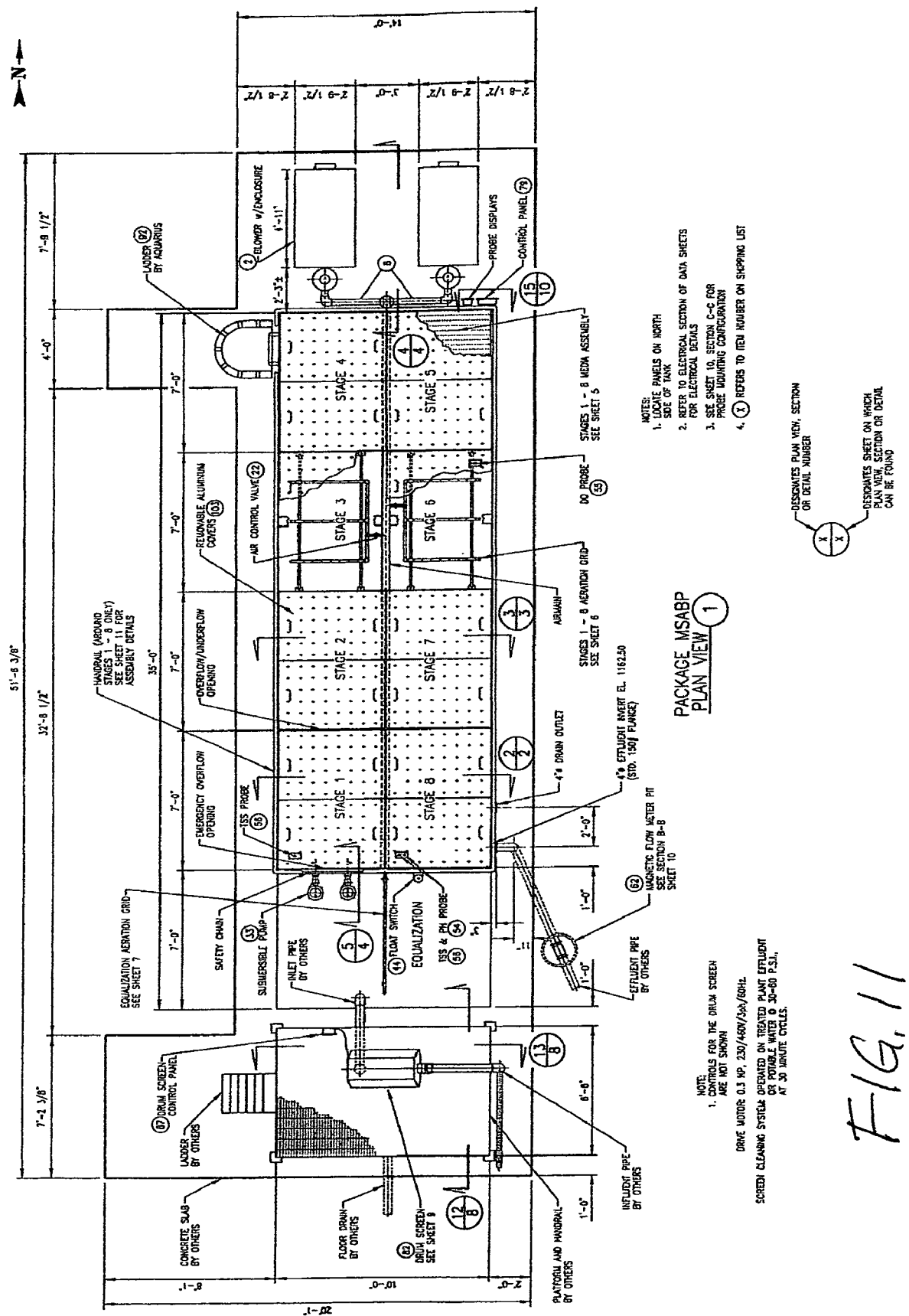
FIG. 11 is a plan view showing a trash screen, equalization basin and digestion tanks.

FIGS. 11-14 illustrate the smaller, 8 stage plant. FIG. 11 is a plan view showing a trash screen and equalization basin having downstream of them 8 covered sequential digestion tanks. FIG. 12 is a top view of one of the digestion tanks of FIG. 11, with its covers removed, showing the tank interior. FIG. 13 is a transverse vertical cross-section through the tank in FIG. 12 taken at section line 7/5. FIG. 14 is an enlarged portion of FIG. 13, showing fasteners which, together with the support members and related portions of the tank walls represent a biomass-supporting panel.

Wastewater enters the plant through the screen, which removes a substantial amount of untreatable material from the wastewater, and then flows into the equalization basin which evens out daily variations in wastewater flow which occur throughout the day. The wastewater then enters stage 1, passing sequentially through it and seven more stages in which treatment is completed and from which treated water is discharged. The upper surfaces of the tanks are obscured by cover plates, but portions of the plates and the support member panels are removed from stage 3 to expose the patterns of aeration grids in the bottoms of the tanks which are fed by an air main running down the center of the plant and fed by blowers.

A representative single tank in FIG. 12 is shown with its covers removed to expose a set of 28 support member panels installed upright in the tank. The other seven tanks contain similar sets of panels. Adjacent panels in each set are in face-to-face parallel relationship with one another on approximately 7 cm centers.

In this figure, the top edges of the panels are visible, as are narrow angles or plates running horizontally along the inside vertical surfaces of the tank walls. These ribs serve as reinforcing ribs for the walls and points of support member attachment. In this case, there is direct attachment of the support members to the tank.

In the vertical cross-section through this representative tank, FIG. 13 taken at section line 7/5 of FIG. 12, one can see the face of a support member panel comprising nine cross supports having between them yarns extending continuously from the bottom to the top of the panel and through the cross-supports. The vertical spacing of the tank reinforcing ribs relative to the lengths of the intervals of unrestrained yarn length in the support member and the relationship of that spacing to the spacing of the cross supports is such as to provide the desired slack, as above described, in those yarn intervals.

Also, between the cross-supports the yarns are substantially unrestrained against motion in radial directions. The support member is stretched tight transversely in the cross-supports. The cross-supports are stretched laterally between the left and right sides of the tank by attachment to the ribs through fasteners, which in this case are the hooks shown in FIG. 14, each having one end embedded in a cross-support and the other end fitted in a hole in the rib. This panel and the others extend from about the water surface down to about 30 cm above the vessel floor.

While these plants can be manually controlled, they will in many instances benefit from the operational stability that can be promoted through automated control. Thus, it is preferred to control plant operation through sensors in the plant, for example solids meters, DO (dissolved oxygen) probes and flow meters, which supply process data to one or more controllers. The latter can for example be programmed to adjust the flow of oxygen-containing gas through the diffusers. This may be accomplished, for example, by commands from the controller(s) to servo valves and/or blower controls. A preferred mode of control is to adjust gas flow so as to maintain predetermined values of DO in the respective stages of treatment, as described above.

ADVANTAGES

The apparatus and processes of the present invention can be employed to attain a number of advantages. Depending on how those practicing it choose to configure it, the present invention makes possible the building and operation, at reasonable costs, of wastewater treatment plants capable of processing wastewaters with one or more of the following advantages:

little or no production of secondary pollution, e.g., excess sludge, bad odors, supporting the growth of or attracting vectors, e.g., flies and rodents, relatively small space requirements, given the production capacity of the plants, and as compared to other types of plants that are free of mechanical problems, ability to maintain supported biomass in a very active condition, ability to operate for lengthy periods with continuing good hydraulic flow through the support member and with infrequent shutdowns for support member maintenance or tank clean-out, high influent waste loadings, good tolerance to load changes and simplified process control.

Other advantages are expected to become apparent as the apparatus and process are used.

The invention claimed is:

1. Biomass support member comprising:
an elongated flexible mass of threads in the form of open-structure, bunched biomass-supporting elongated yarns that comprises gathered curly filaments in the yarns, and run generally in a common direction, along-side one another in the mass, and with overlapping of adjacent yarns of the mass, which mass of yarns has an expanse of length and width that are each at least 15 times their general thickness, and is "hydraulically open" in that water can flow from one face of the member, when laden with biomass, to biomass in the interior of the member, wherein the mass has a plurality of cross-supports, extending across the yarns at two or more intervals of yarn length, and comprises support member filaments that are of multi-lobed cross-section.

2. Biomass support member according to claim 1 wherein the plurality of cross-supports holds the yarns together in regions that, collectively, represent a minor proportion of total yarn length.

3. Biological wastewater treatment plant comprising a series of at least three wastewater aeration vessels connected for sequential flow of wastewater under treatment through the series of vessels, a plurality of panels of biomass support members according to claim 2 disposed in spaced apart relationship to one another in a plurality of the vessels, the support members being secured in a deployed condition in the vessels, diffusers in the vessels to discharge oxygen-containing gas into the wastewater and the panels being deployed over the diffusers to cause currents of aerated wastewater to rise between panels.

4. Biological wastewater treatment plant according to claim 3 comprising support member filaments that are non-hollow.

5. Biological wastewater treatment plant according to claim 3 comprising filaments of adjacent yarns of the support members that overlap one another and wherein the support members comprise plural layers of the yarns.

6. Biological wastewater treatment plant according to claim 3 comprising panels which are sufficiently hydraulically open so that currents of water containing dissolved oxygen can pass through the support members, from one support member face into the support members and biomass toward the other support member face, bearing oxygen to microbes within biomass supported on the panels.

7. Biological wastewater treatment plant according to claim 6 comprising panels which are sufficiently hydraulically open so that currents of water containing dissolved oxygen can pass through the support members, from one face all the way through to the other face.

8. Biological wastewater treatment plant according to claim 3 comprising biomass support members comprising woven or non-woven cross-supports to hold the yarns of the support members together, and the cross-supports serve as support member attachment points to keep the yarns deployed in a stable manner as generally planar and/or non-planar panels in the currents of wastewater and aeration gas present in an operating wastewater treatment tank.

9. Biomass support member according to claim 1, deployed in a spread out condition as a biomass-supporting panel, in a biological treatment vessel.

10. Biomass support member according to claim 1, wherein the bunched biomass-supporting elongated yarns are crowded together to impart to the mass at least one of the following properties a, b, c, d or e:
   a. T, a general thickness value of at least 20 mm, that exceeds the average length-weighted yarn width of the respective yarns,
   b. Tw, the ratio of the thickness (T) of the member to average length-weighted yarn width (w) of substantially at least 3 mm,
   c. Lt, average light transmission value, of less than 17.6%,
   d. Wm, ratio of weight of water (W) absorbed per unit weight of member (m), in excess of 3.7,
   e. Wa, biomass attachment weight capacity per unit weight of clean member, of at least 0.8.

11. Biological treatment process which comprises, in at least a portion of the process, using support member panels comprising
   an elongated flexible mass of threads in the form of open-structure, bunched biomass-supporting elongated yarns that comprises gathered curly filaments in the yarns, and run generally in a common direction, along-side one another in the mass, and with overlapping of adjacent yarns of the mass, which mass of yarns has an expanse of length and width that are each at least 15 times their general thickness, and is "hydraulically open" in that water can flow from one face of the member, when laden with biomass, to biomass in the interior of the member, wherein the mass has a plurality of cross-supports, extending across the yarns at two or more intervals of yarn length, and comprises support member filaments that are of multi-lobed cross-section to support biomass.

12. Biological treatment process according to claim 11 comprising, in one or more liquid-containing treatment zones, causing controlled amounts of biomass to slough off into the wastewater in one or more successive zones while causing a substantial amount of biomass supported in the respective zones to remain and continue growing on the panels in those zones.

13. Biological treatment process according to claim 12, conducted with sloughing off of biomass from said panels in a plurality of said zones.

14. Biological treatment process according to claim 13 in which the panels are used as microbe supports in multi-stage activated biological processes (MSABPs) comprising spatial microorganism succession and trophic hydrobiont chains, said chains being segregated in sequentially arranged zones, in which conditions are provided that cause controlled amounts of biomass to slough off from supported microbe populations in a succession of zones, sloughed off microbes are passed downstream from zone to zone and are eaten by progressively different populations of microorganisms supported by the panels in the succeeding zones.

15. Biological treatment process according to claim 11 in which at least about 90% of the sludge generated and passed from stage to stage in the process is consumed in the process.

16. Biological treatment process according to claim 11 in which said support members are present in panels comprising yarns with intervals of length within which the yarns are substantially free of restraint to afford controlled lateral swaying of the yarns in radial directions along their lengths, with the aid of currents of oxygen-containing gas rising through liquid adjacent and/or through the yarns of the panels.

17. Biological treatment process according to claim 11, in which the amount of sludge present in the treated water released from the process has a concentration in that water of 30 mg/l or less.

18. Biological treatment process according to claim 11, wherein the bunched biomass-supporting elongated yarns are crowded together to impart to the mass at least one of the following properties a, b, c, d or e:
   a. T, a general thickness value of at least 20 mm, that exceeds the average length-weighted yarn width of the respective yarns,
   b. Tw, the ratio of the thickness (T) of the member to average length-weighted yarn width (w) of substantially at least 3 mm,
   c. Lt, average light transmission value, of less than 17.6%,
   d. Wm, ratio of weight of water (W) absorbed per unit weight of member (m), in excess of 3.7,
   e. Wa, biomass attachment weight capacity per unit weight of clean member, of at least 0.8.

19. Biological treatment process according to claim 11, in which the amount of sludge present in the treated water released from the process has a concentration in that water which is dependent upon the level of completion of treatment in said treatment process.

* * * * *